US009063742B1

(12) United States Patent
Bienkowski et al.

(10) Patent No.: US 9,063,742 B1
(45) Date of Patent: Jun. 23, 2015

(54) VERSION HISTORIES FOR MULTIPLE PORTIONS OF PROGRAM CODE

(71) Applicant: The MathWorks, Inc., Natick, MA (US)

(72) Inventors: Joseph R. Bienkowski, Ashland, MA (US); Jared D. MacDonald, Cambridge, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/109,236

(22) Filed: Dec. 17, 2013

Related U.S. Application Data

(63) Continuation-in-part of application No. 14/059,872, filed on Oct. 22, 2013.

(51) Int. Cl.
*G06F 9/44* (2006.01)

(52) U.S. Cl.
CPC ... *G06F 8/34* (2013.01); *G06F 8/71* (2013.01)

(58) Field of Classification Search
USPC .................................. 717/113–116, 123–127
IPC ........................................ G06F 8/20,8/34, 8/35
See application file for complete search history.

(56) References Cited

U.S. PATENT DOCUMENTS

| 5,966,532 | A * | 10/1999 | McDonald et al. | 717/105 |
|---|---|---|---|---|
| 6,131,185 | A * | 10/2000 | Coskun et al. | 717/129 |
| 6,385,769 | B1 * | 5/2002 | Lewallen | 717/125 |
| 6,542,900 | B1 * | 4/2003 | Xia | 717/116 |
| 6,925,635 | B2 * | 8/2005 | Garvey | 717/143 |
| 7,200,838 | B2 * | 4/2007 | Kodosky et al. | 717/116 |
| 7,222,333 | B1 * | 5/2007 | Mor et al. | 717/115 |
| 7,383,534 | B1 * | 6/2008 | Agbabian et al. | 717/120 |
| 7,444,619 | B2 * | 10/2008 | McManus | 717/114 |
| 7,506,304 | B2 * | 3/2009 | Morrow et al. | 717/109 |
| 7,530,052 | B2 * | 5/2009 | Morrow et al. | 717/113 |
| 7,694,277 | B2 * | 4/2010 | Yuknewicz et al. | 717/121 |
| 7,949,995 | B2 * | 5/2011 | Sadlek | 717/109 |
| 8,037,452 | B2 * | 10/2011 | Minium et al. | 717/122 |
| 8,151,244 | B2 * | 4/2012 | Hsu et al. | 717/113 |
| 8,296,730 | B2 * | 10/2012 | Whitechapel et al. | 717/116 |

(Continued)

OTHER PUBLICATIONS

Ficco et al, "Bug Localization in Test-Driven Development" ACM—Hindawi Publishing Corporation Advances in Software Engineering, vol. 2011, Article ID 492757, pp. 1-18, 2011.*

(Continued)

*Primary Examiner* — Anil Khatri
(74) *Attorney, Agent, or Firm* — Harrity & Harrity, LLP

(57) ABSTRACT

A device may partition program code into multiple portions. The device may detect a first modification to a first portion of program code from a first version to a second version, and may detect a second modification to a second portion of program code from a third version to a fourth version. The device may detect the second modification after detecting the first modification. The device may store a first version history that identifies the first version, the second version, and a first temporal relationship between the first and second versions. The device may store a second version history that identifies the third version, the fourth version, and a second temporal relationship between the third and fourth versions. The device may receive an indication to undo the first modification after detecting the second modification, and may undo the first modification, without undoing the second modification, based on receiving the indication.

20 Claims, 24 Drawing Sheets

(56) References Cited

U.S. PATENT DOCUMENTS 8,683,318 B1* 3/2014 Dasari et al. .......... 715/234
8,904,349 B2* 12/2014 Hudson et al. .......... 717/116

OTHER PUBLICATIONS

DiGiuseppe, "Automatically Describing Software Faults", ACM, pp. 711-714, 2013.*

Fontana et al, "Investigating the Impact of Code Smells Debt on Quality Code Evaluation", IEEE, pp. 15-22, 2012.*

Fontana et la, "Impact of Refactoring on Quality Code Evaluation", ACM, pp. 37-40, 2011.*

Song et al, "Enhancing Source-Level Programming Tools with an Awareness of Transparent Program Transformations", ACM, 301-318, 2009.*

Ohshima et al, "KScript and KSWorld: A Time-Aware and Mostly Declarative Language and Interactive GUI Framework", ACM, pp. 117-134, 2013.*

Co-pending U.S. Appl. No. 14/059,872, filed Oct. 22, 2013 entitled "A Program Code Interface for Providing Program Code and Corresponding Results of Evaluating the Program Code", Bienkowski et al., 120 pages.

* cited by examiner

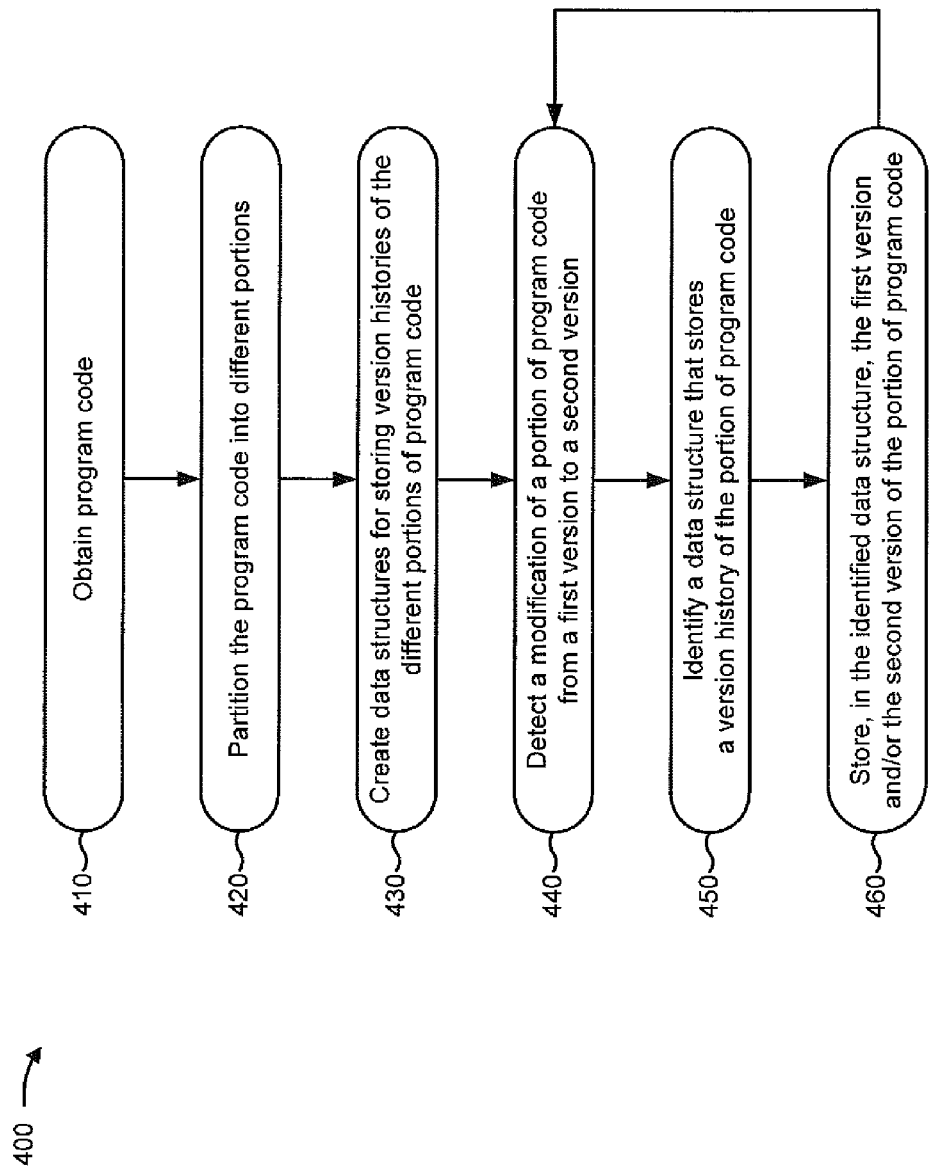

FIG. 5A

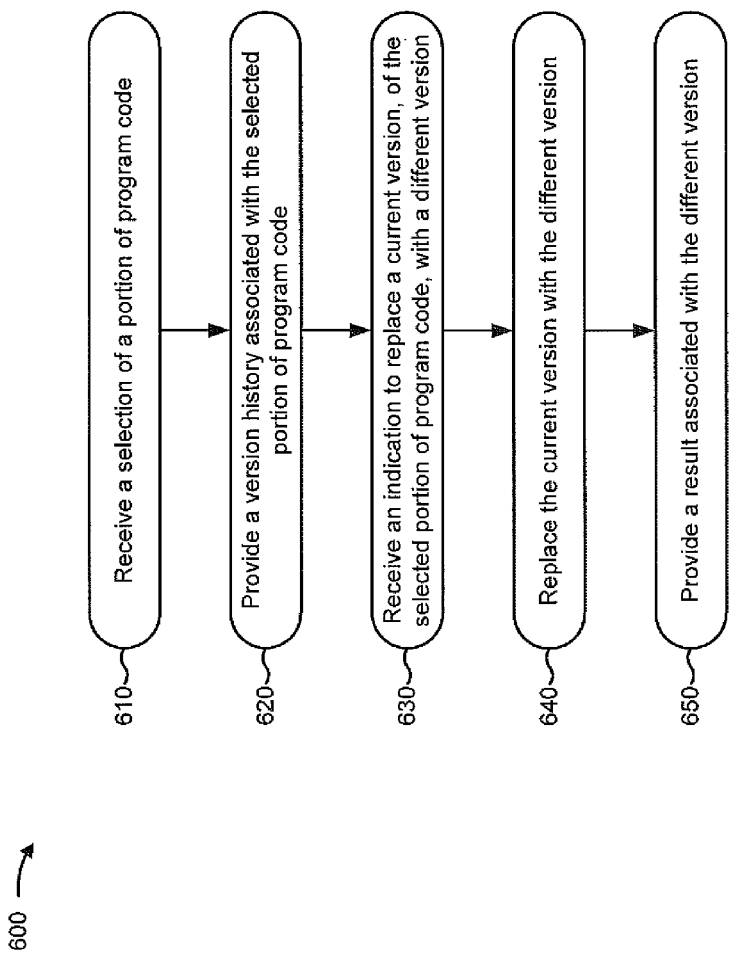

FIG. 7A

```
TECHNICAL COMPUTING ENVIRONMENT (TCE 220)
File    Edit    Tools    View    Evaluate
                         Show version history indicator(s)
Code Editor Window       Hide version history indicator(s)  dow
                                                    ─ 702 x = [1 4, 2 4, 3 4]

y = [4 4]
                    x =  | 2 | 4 |
                         | 3 | 4 |
ploy(y)
                    y =  | 4 | 4 |
func (DoMath)
    z = y + y       Error in ploy(y). Invalid
    return z        function.
end
                    func (DoMath) = [8 8]
```

VERSION HISTORIES FOR MULTIPLE PORTIONS OF PROGRAM CODE

RELATED APPLICATION

This application is a continuation-in-part (CIP) of U.S. patent application Ser. No. 14/059,872, filed on Oct. 22, 2013, the content of which is incorporated by reference herein in its entirety.

BRIEF DESCRIPTION OF THE DRAWINGS

FIG. 4 is a flow chart of an example process for storing a version history for multiple portions of program code;

FIGS. 5A-5D are diagrams of an example implementation relating to the example process shown in FIG. 4;

FIG. 6 is a flow chart of an example process for replacing a first version of a program code portion with a second version of the program code portion.

DETAILED DESCRIPTION

The following detailed description of example implementations refers to the accompanying drawings. The same reference numbers in different drawings may identify the same or similar elements.

In a programming environment, a programmer may make modifications to different portions of program code, such as modifications to different lines of program code. The programmer may wish to undo a modification, or to restore a portion of program code to a prior version that has since been modified. However, performing an undo operation may cause a most recent modification to be undone, and the most recent modification may not correspond to the portion of program code that the programmer wishes to restore. Implementations described herein make it easier for a programmer to undo modifications to a particular portion of program code that is selectable by the programmer. For example, the selected portion of program code may, or may not, be the portion of program code that was most recently modified. Implementations described herein may allow the programmer to restore a prior version of the selected portion of program code. Thus, the programmer may switch to a version of program code that gives the programmer a desired output, rather than simply undoing a most recent modification to the program code.

Figure 1A:
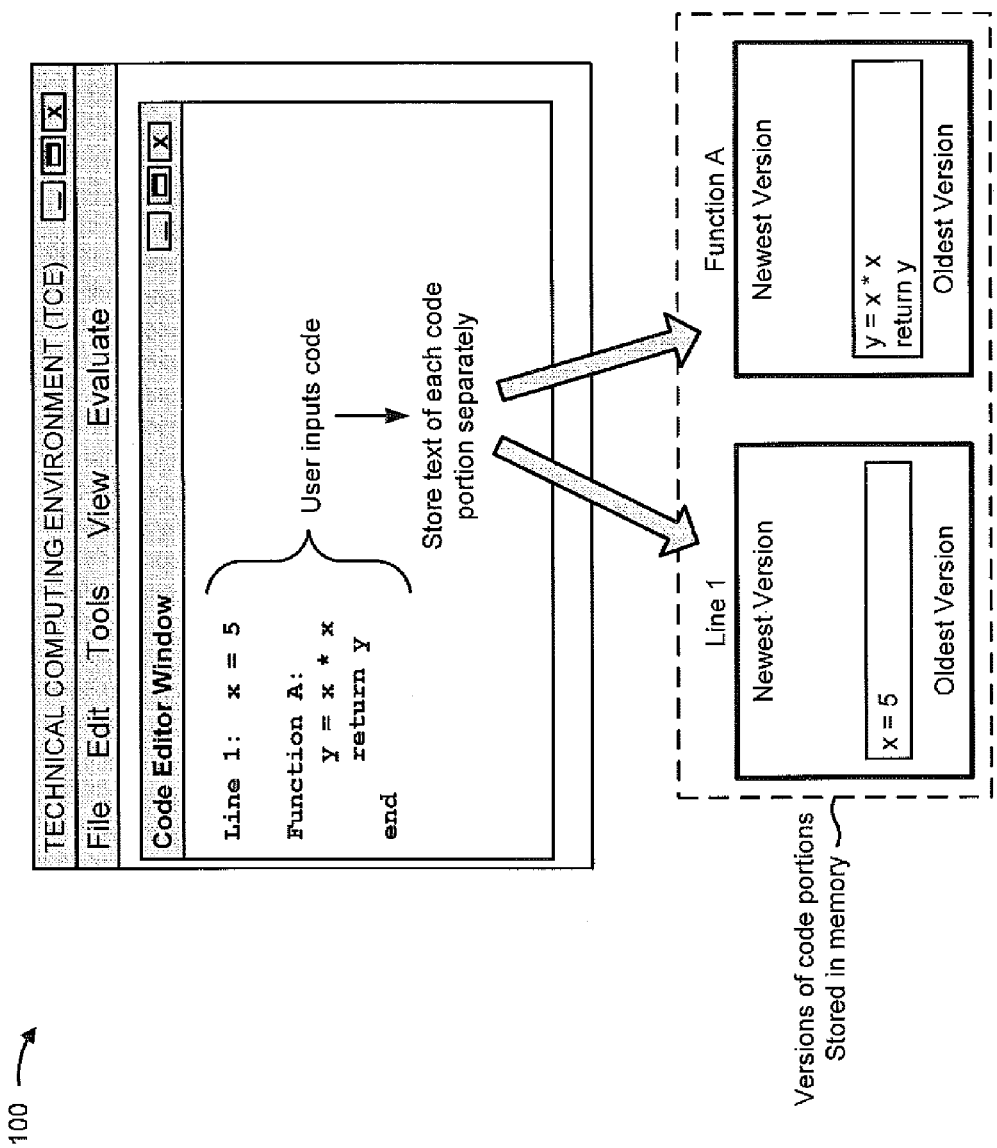
FIGS. 1A-1D are diagrams of an overview of an example implementation described herein.

FIGS. 1A-1D are diagrams of an overview of an example implementation 100 described herein. As shown in FIG. 1A, a user (e.g., a computer programmer) may input program code via a code editor window of a technical computing environment (TCE) executing on a client device. For example, in FIG. 1A, the program code is shown as a first line of code ("Line 1"), shown as x=5, and several lines of code included in a function ("Function A"), which includes the line y=x*x. As further shown in FIG. 1A, the client device may store the code included in each portion separately. For example, the client device may store the program code corresponding to Line 1 in a first data structure (e.g., a stack, such as an undo/redo stack), and may store the program code corresponding to Function A in a second data structure.

Figure 1B:
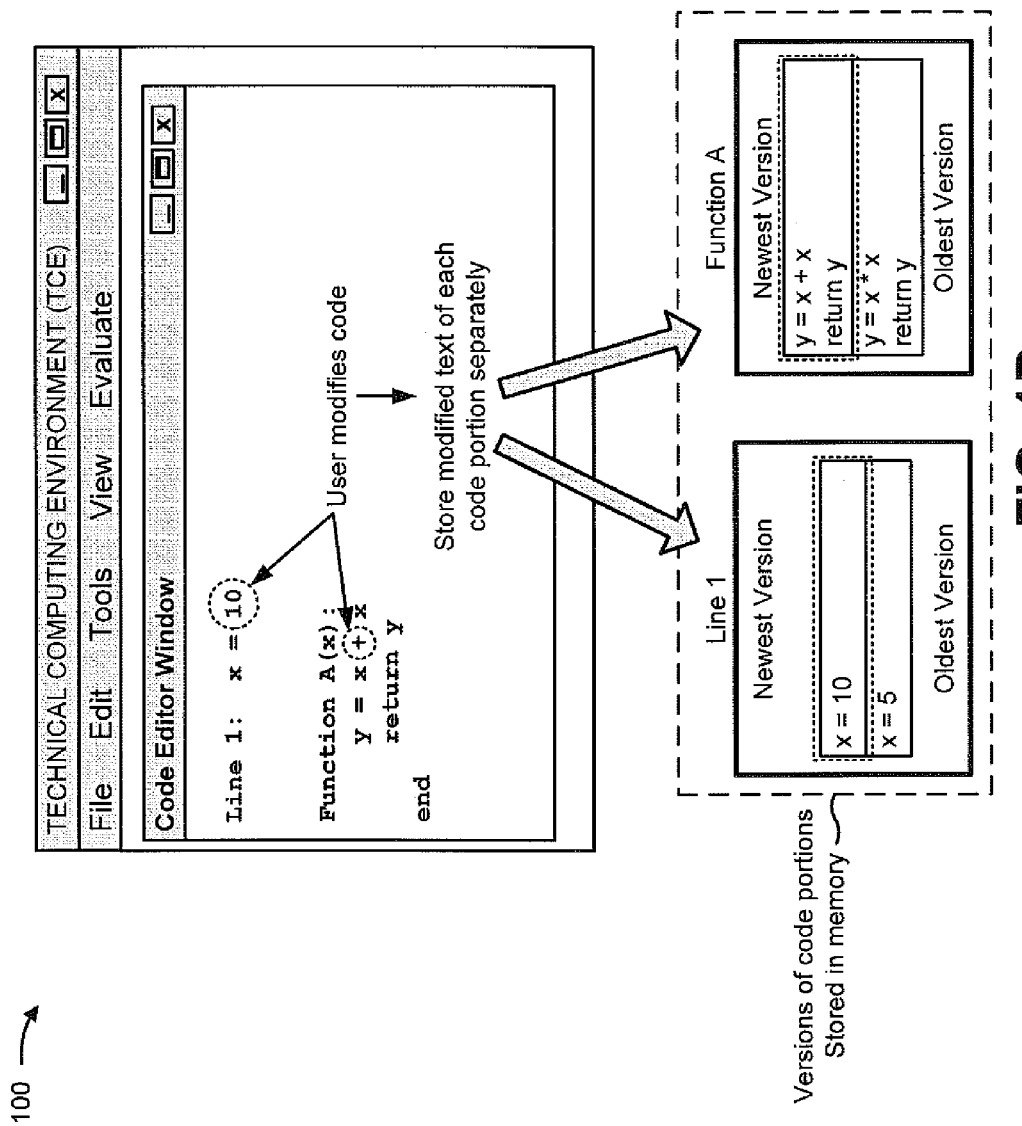

As shown in FIG. 1B, assume the user modifies Line 1 to x=10, and modifies Function A to include the line of code y=x+x. As further shown, the client device may store the new versions of Line 1 and Function A in separate data structures, while also retaining the old versions. Thus, the data structure associated with Line 1 stores the program code x=10 and x=5, and also provides an indication that x=10 is a more recent version of Line 1 than x=5. Likewise, the data structure associated with Function A stores the program code y=x+x (e.g., along with the rest of Function A) and y=x*x (e.g., along with the rest of Function A), and provides an indication that the line y=x+x is included in a more recent version of Function A than the line y=x*x.

Figure 1C:
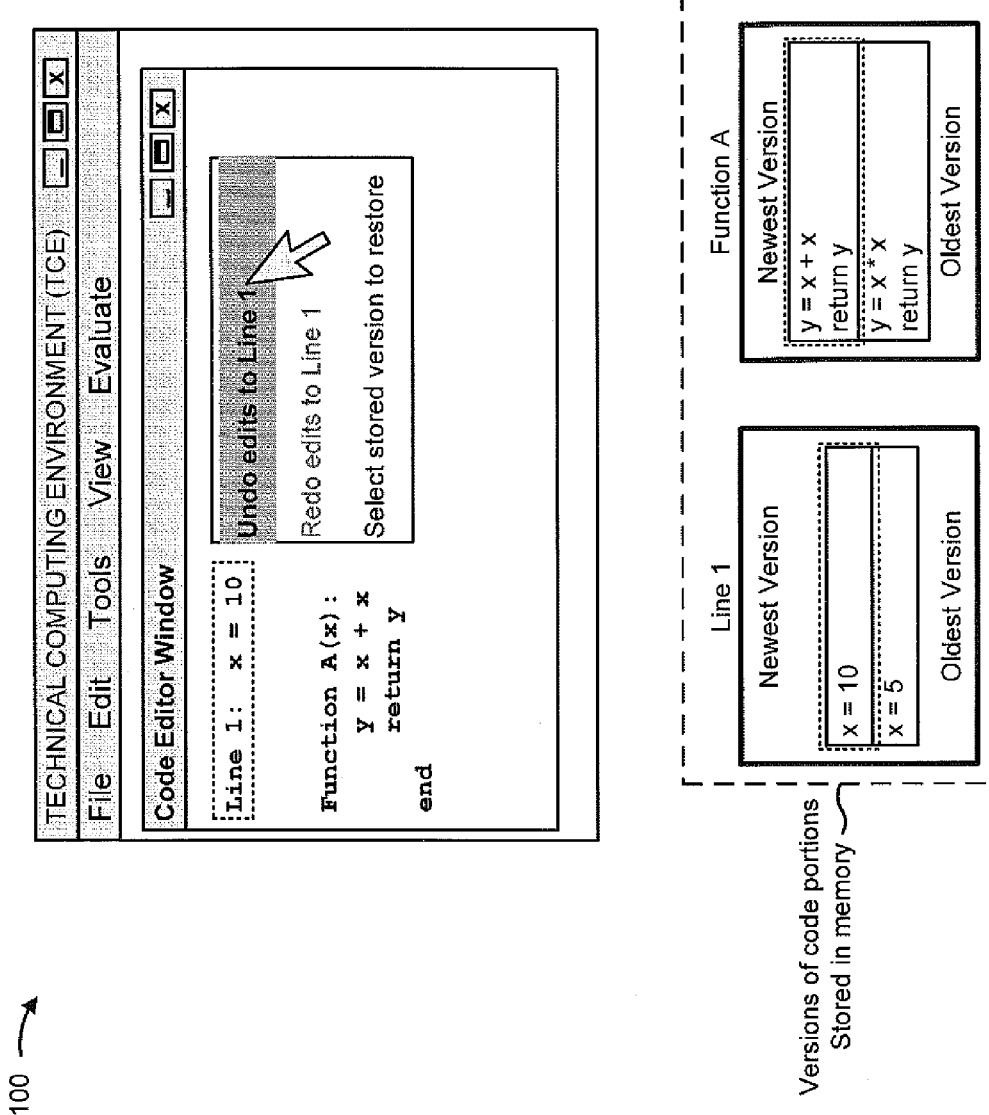
Figure 1D:
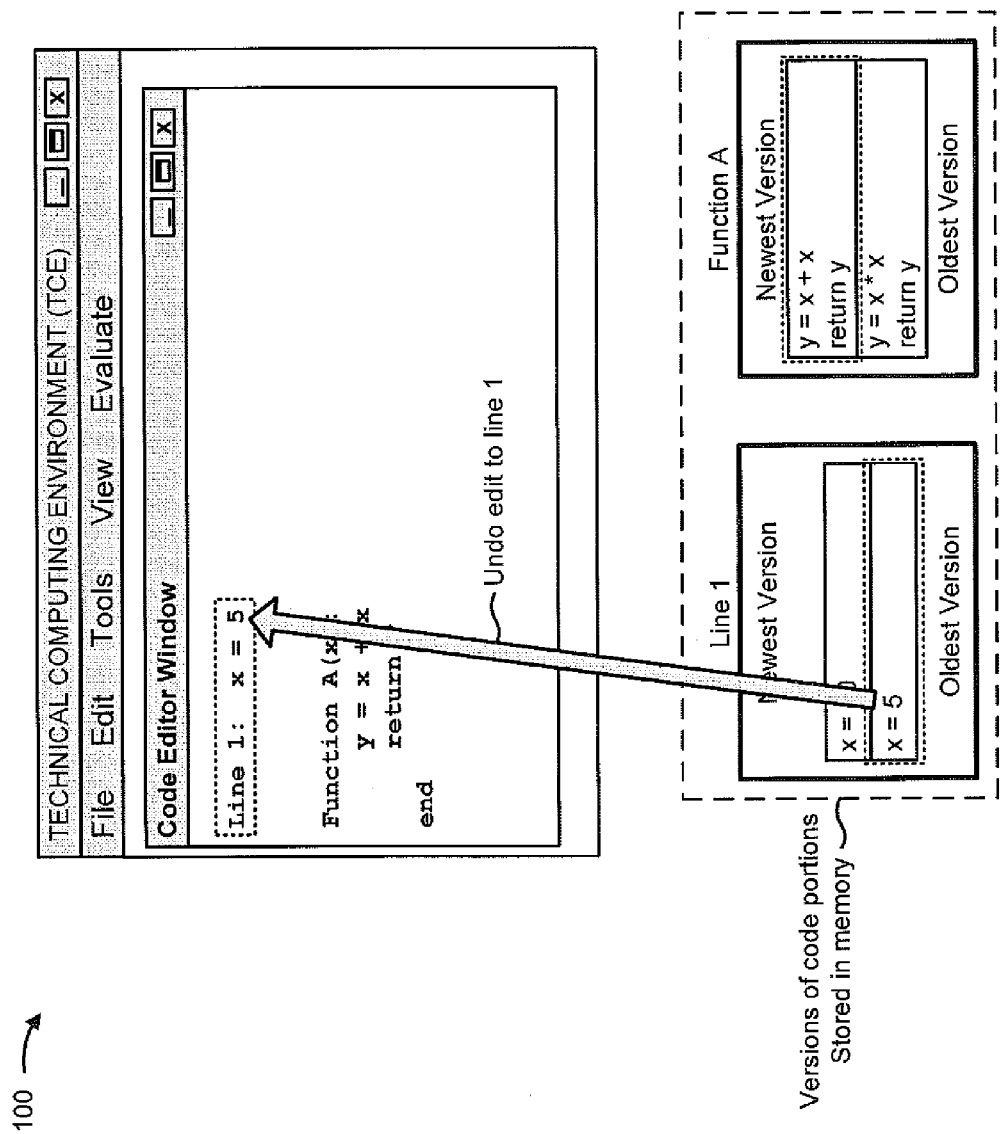

As shown in FIG. 1C, the client device may provide an input mechanism that allows the user to restore different versions of a particular portion of program code (e.g., by undoing a modification, by redoing a modification, by selecting a version, etc.). For example, assume that the user selects to undo a most recent edit to Line 1, as shown. Based on this selection, and as shown in FIG. 1D, the client device identifies the data structure associated with Line 1, identifies that x=5 is the program code to be restored based on the undo operation, and restores the program code x=5 to Line 1 of the program code. In some implementations, the client device may execute the restored program code and/or may restore a result associated with the restored program code. In this way, a user may easily switch between different versions of a portion of program code (e.g., different versions of the portion that have been modified over time), without requiring the user to undo modifications to other portions of program code.

Figure 2:
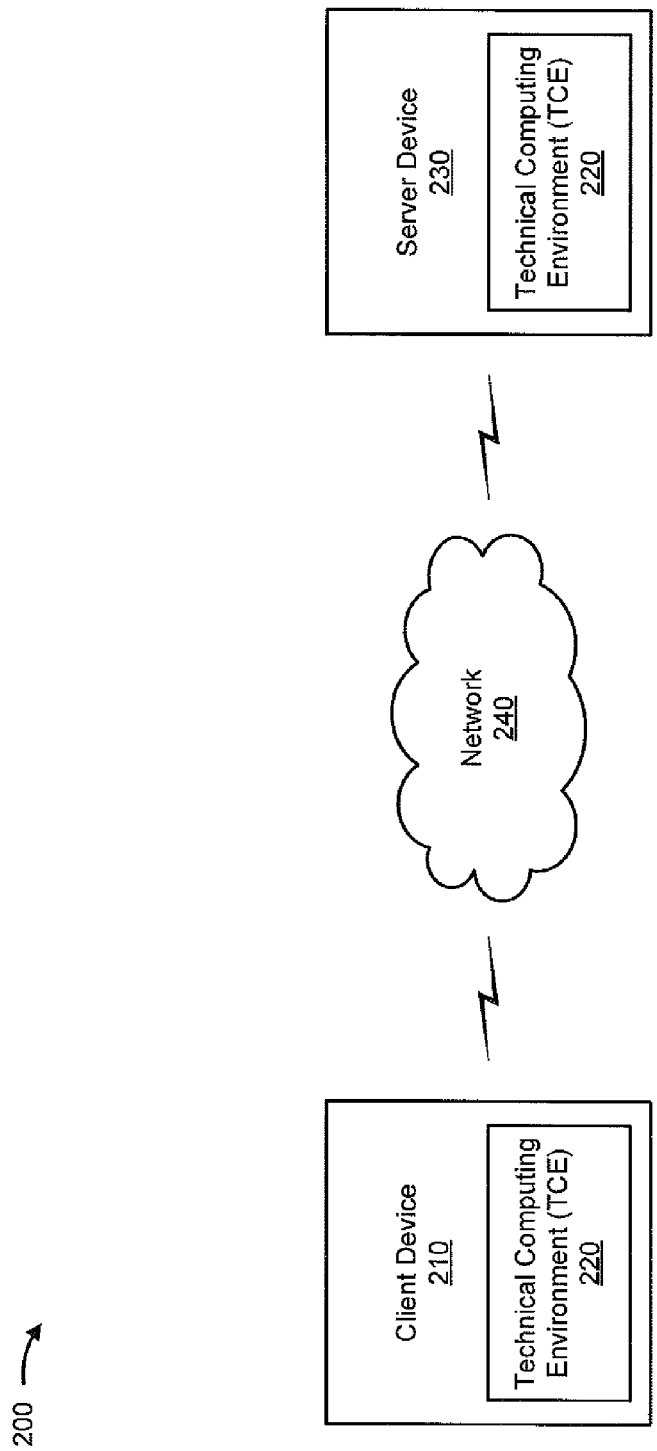
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a version history, a result of evaluating program code, etc.). For example, client device 210 may include a computing device, such as a desktop computer, a laptop computer, a tablet computer, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), etc. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, Sim- Events® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. In some implementations, TCE 220 may include a command line interface.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel), and may provide respective results of evaluating the program code to client device 210. Additionally, or alternatively, one or more server devices 230 may be used to store a version history associated with one or more portions of program code.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
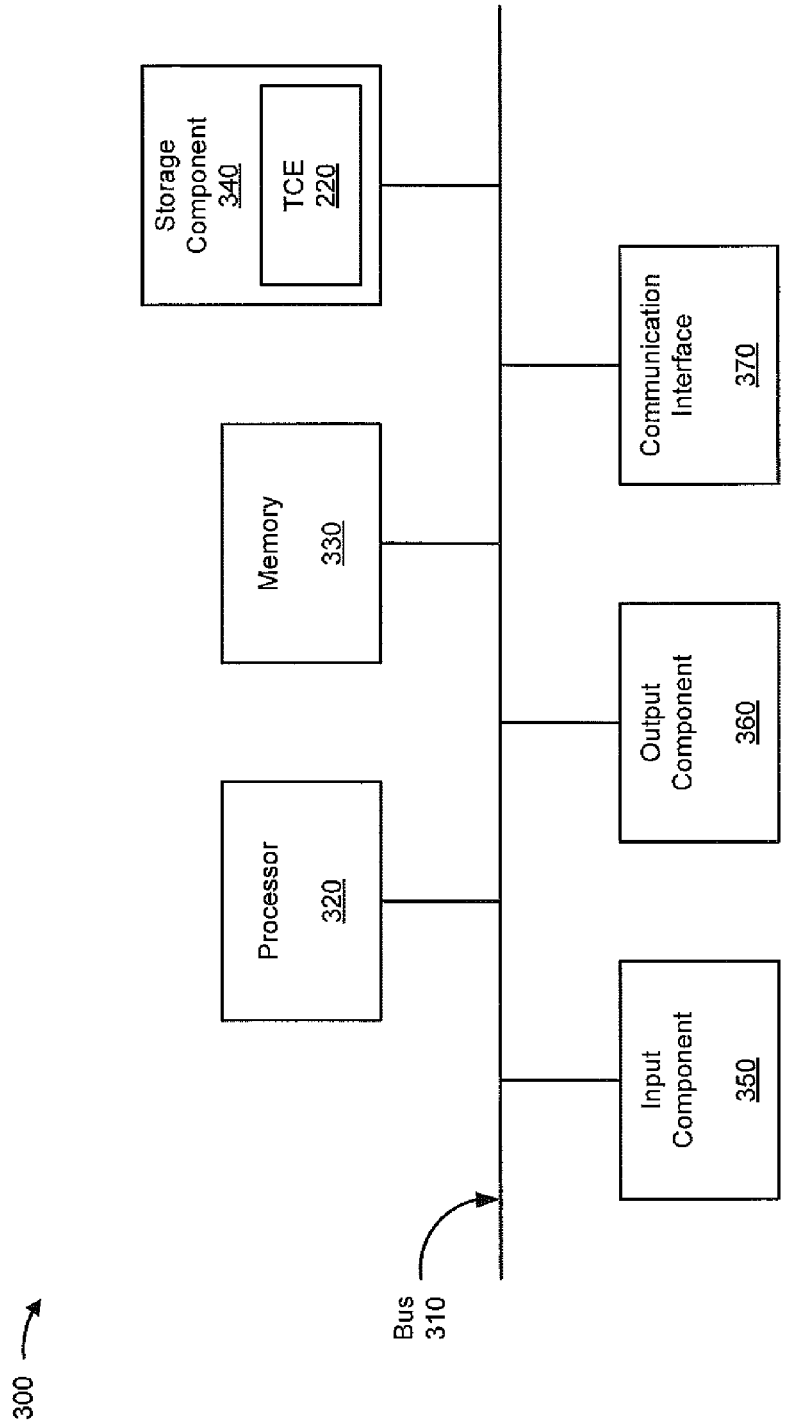
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for storing a version history for multiple portions of program code. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include obtaining program code (block 410). For example, client device 210 may obtain program code. In some implementations, a user may input information identifying the program code or a memory location at which the program code is stored (e.g., local to and/or remote from client device 210). Based on the user input, client device 210 may retrieve the program code. Additionally, or alternatively, client device 210 may provide a user interface (e.g., via TCE 220) via which a user may input program code, and client device 210 may obtain the input program code via the user interface.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, VERILOG® code, JAVA® code, another type of hardware and/or software based code that may be compiled and/or synthesized, etc.), binary code that may be executed (e.g., executable files that may be directly executed by an operating system, bitstream files that may be used to configure an FPGA, JAVA® byte code, object files combined together with linker directives, source code, makefiles, etc.), text files that may be executed in conjunction with other executables (e.g., PYTHON® text files, OCTAVE® files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

As further shown in FIG. 4, process 400 may include partitioning the program code into different portions (block 420). For example, client device 210 may partition the program code into multiple different portions. A portion of program code (sometimes referred to herein as a program code portion) may refer to a portion of a program, such as one or more lines of program code, a string of one or more characters of program code, a set of strings of program code, a block of program code, a function, a method, a script, an object, etc.

In some implementations, client device 210 may partition the program code such that a portion of code corresponds to a line of code. Additionally, or alternatively, client device 210 may partition the program code such that a portion of code corresponds to a function (e.g., multiple lines of code included in the function), and/or a function and code relating to the function (e.g., lines of code that include variables that are part of the function, that call the function, etc.). In some implementations, client device 210 may partition the program code automatically. Additionally, or alternatively, client device 210 may partition the program code based on user input that identifies the partitions and/or that provides parameters for automatic partitioning.

As further shown in FIG. 4, process 400 may include creating data structures for storing version histories of the different portions of program code (block 430). For example, client device 210 may create a first data structure for storing a version history that identifies different versions of a first portion of program code, may create a second data structure for storing a version history that identifies different versions of a second portion of program code, etc. A version history may include information that identifies one or more versions of a portion of program code (e.g., versions created based on inputting and/or modifying the portion of program code).

In some implementations, the different data structures may be separately identifiable. For example, client device 210 may use information identifying the first portion of program code to identify the first data structure. Additionally, or alternatively, client device 210 may create a data structure (e.g., a single data structure or multiple data structures) that associates a first version history with a first portion of program code, that associates a second version history with a second portion of program code, etc.

In some implementations, client device 210 may create a data structure for a particular portion of program code after the particular portion has been identified by the partitioning process. Additionally, or alternatively, client device 210 may create a data structure for a particular portion of program code after the particular portion of program code has been modified (e.g., once multiple versions of the portion of program code have been created).

In some implementations, the data structure may be stored locally on client device 210. Additionally, or alternatively, the data structure may be stored remote from client device 210, such as by storing the data structure on server device 230. For example, client device 210 may transmit information to server device 230 for storage in the data structure.

A data structure may include any type of data structure, such as a table with rows and columns, a linked list, a tree, a hash table, a database, or any other type of data structure. In some implementations, the data structure may include a stack, such as an undo/redo stack.

As further shown in FIG. 4, process 400 may include detecting a modification of a portion of program code from a first version to a second version (block 440). For example, a user may provide input to client device 210 that causes a portion of program code to be modified from a first version to a second version. The modification may include, for example, adding program code to the portion, deleting program code from the portion, editing program code included in the portion, etc.

Client device 210 may detect the modification based on, for example, receiving an indication that the user has finished inputting, modifying, and/or deleting a program code portion. For example, the user may navigate away from a modified program code portion, such as by inputting a carriage return (e.g., via an "Enter" or "Return" key on a keyboard) to move a cursor to a different program code portion (e.g., a new line), clicking on a different program code portion (e.g., using a mouse, a gesture, etc.), etc.

As another example, client device 210 may detect the modification based on receiving user input of one or more characters that indicate that the user has finished inputting, modifying, and/or deleting a program code portion. Additionally, or alternatively, client device 210 may detect the input and/or the modification based on detecting a pause in input, in some implementations. For example, a user may stop providing input (e.g., may stop typing program code), and client device 210 may determine that a threshold amount of time has elapsed since the user stopped providing input. Additionally, or alternatively, client device 210 may detect the modification by using an eye tracking device (e.g., a camera) to determine that the user has looked away from client device 210, a code editor window, a portion of program code (e.g., a portion being input and/or modified), etc.

In some implementations, client device 210 may treat multiple modifications as a single modification. For example, the user may edit several lines included in a function. Client device 210 may detect that the function has been modified when, for example, the user clicks outside of the function, edits program code outside of the function, or the like.

As further shown in FIG. 4, process 400 may include identifying a data structure that stores a version history of the portion of program code (block 450). For example, based on detecting the modification to a portion of program code, client device 210 may identify a data structure that stores a version history of the portion of program code. A data structure may include and/or may be associated with information, such as a label, that indicates a code portion for which the data structure stores a version history. Client device 210 may identify the data structure by searching for the label. Additionally, or alternatively, client device 210 may identify one or more versions associated with the portion of program code (e.g., by searching a single data structure for a label).

In some implementations, client device 210 may identify a previously-created data structure that stores a version history associated with the portion of program code (e.g., a data structure created based on inputting the program code portion, creating the program code portion as a partition of a program, etc.). Additionally, or alternatively, client device 210 may identify a data structure by creating a new data structure for storing the version history associated with the portion of program code (e.g., based on a modification that creates more than one version of the program code portion).

As further shown in FIG. 4, process 400 may include storing, in the identified data structure, the first version and/or the second version of the portion of program code (block 460). For example, client device 210 may identify the data structure, and may store the first version and/or the second version of the portion of program code in the data structure. Client device 210 may store the first version before or after the modification of the portion of program code from the first version to the second version. Additionally, or alternatively, client device 210 may store the second version after the modification of the portion of program code from the first version to the second version.

In some implementations, client device 210 may store a version in a local data structure exclusive to the portion of program code, and may also store the version in a global data structure that stores versions of a file and/or program that includes the portion of program code. Additionally, or alternatively, client device 210 may store the version in multiple data structures associated with different granularity levels, such as a line level, a function level, a block level, a file level, a program level, etc. In this way, a user may select a granularity level at which an undo operation, a redo operation, and/or a restore operation is to be performed, and client device 210 may perform the operation at the selected granularity level using the data structure associated with the selected granularity level.

Client device 210 may associate the first version and/or the second version with the portion of program code to which the first and second version relate. For example, client device 210 may associate the versions with a particular portion of program code by storing the versions in a data structure that only stores versions associated with the particular portion of program code (e.g., a data structure that does not store versions associated with other portions of program code). Additionally, or alternatively, client device 210 may associate the versions with a particular portion of program code by storing information that identifies a relationship between the versions and the particular portion of program code. In this way, client device 210 may store version histories associated with different portions of program code in the same data structure or in different data structures, while still being able to identify a portion of program code to which a version relates.

Client device 210 may store information that identifies a temporal relationship between stored versions of the program code portion. For example, the temporal relationship may indicate that a first version was obtained, input, and/or stored before a second version was obtained, input, and/or stored. As another example, the temporal relationship may indicate that the first version was obtained, input, and/or stored after the second version was obtained, input, and/or stored.

Client device 210 may store a program code evaluation result (sometimes referred to herein as a result) associated with a version of a program code portion, in some implementations. The program code evaluation result may include a result of executing the program code portion, may identify one or more errors associated with the program code portion (e.g., based on one or more portions of program code that failed to execute), may include help information associated with the program code portion, etc. Additionally, or alternatively, client device 210 may store an indication of an association between a result, a version, a portion of code, a temporal relationship, etc.

Client device 210 may store information that identifies a user associated with a version of a program code portion, in some implementations. For example, multiple users may be responsible for creating and/or editing program code. When a particular user makes a modification to a portion of program code to a new version, client device 210 may store information that identifies the user (e.g., a user ID), and an association between the user and the new version. In this way, a user may select to view modifications that the user made to the program code, and/or may select to view modification that one or more other users made to the program code.

As further shown in FIG. 4, process 400 may include returning to block 440 to perform one or more steps of process 400 based on detecting an additional modification to a program code portion (e.g., the same program code portion or a different program code portion). For example, client device 210 may detect a modification that creates a third version of a program code portion that has already been modified from a first version to a second version. Client device 210 may identify a data structure associated with the program code portion, and may store, in the identified data structure, the third version. Additionally, or alternatively, client device 210 may store a temporal relationship between the third version and the first and/or second version, may store a result associated with the third version, etc. In this way, client device 210 may create a data structure that stores a version history associated with the modified portion of program code.

As another example, client device 210 may detect a modification to a different portion of program code. For example, the modification may modify the different portion of program code from a first version to a second version. Client device 210 may identify a different data structure associated with the different program code portion, and may store, in the identified data structure, the second version. Additionally, or alternatively, client device 210 may store a temporal relationship between the second version and the first version, may store a result associated with the first version, etc.

In this way, client device 210 may store multiple version histories, and each version history may correspond to a different portion of program code. This may aid a user in restoring a version associated with a particular portion of program code, as described in more detail herein in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D depict examples where client device 210 stores separate version histories for multiple portions of program code.

Figure 5A:
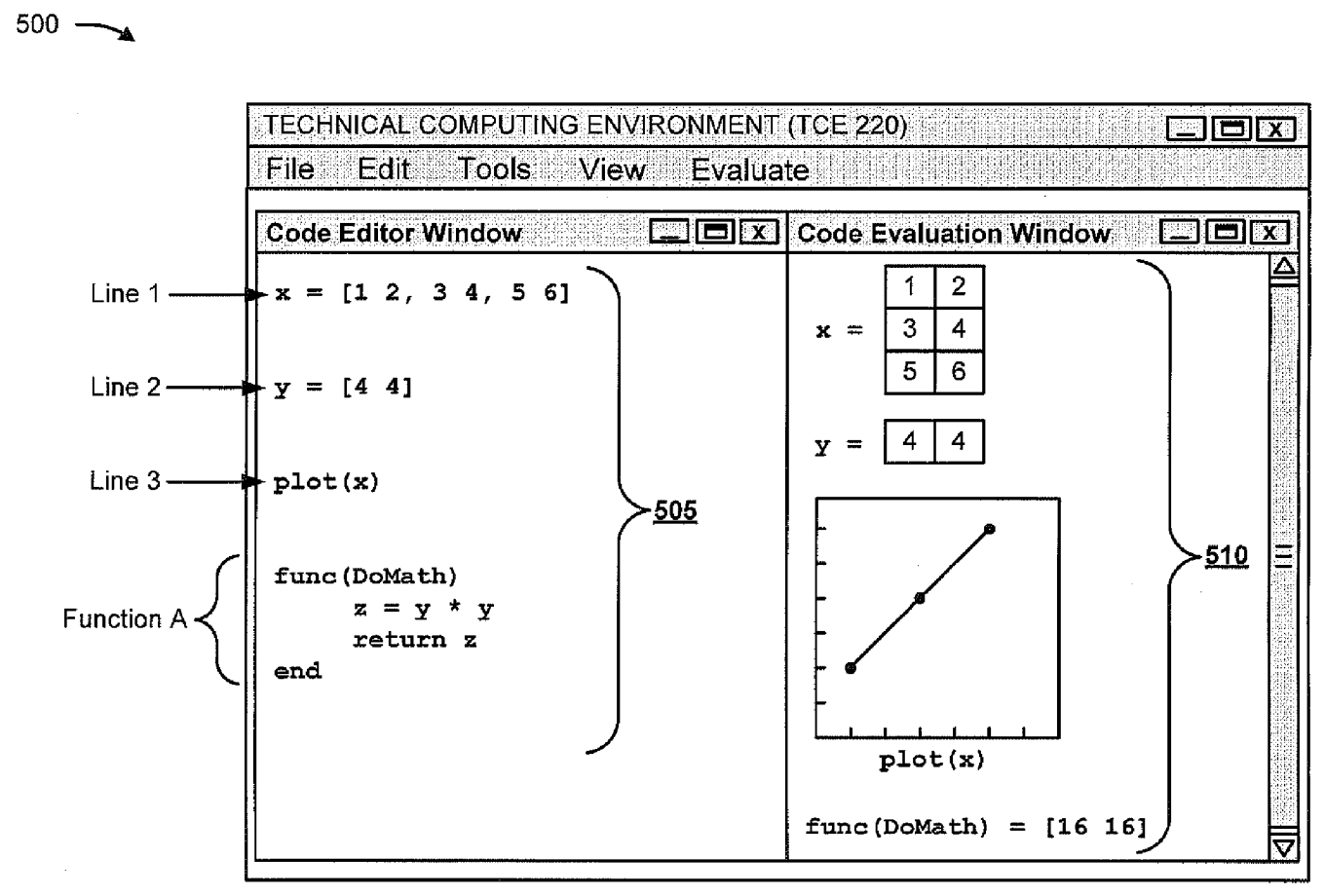

As shown in FIG. 5A, and by reference number 505, assume that the user has input program code into a code editor window of TCE 220. For example, assume that the user has input the following code:

x=[1 2, 3 4, 5 6]
y=[4 4]
plot(x)
func(DoMath)
  z=y*y
  return z
end.

As further shown in FIG. 5A, assume that client device 210 partitions the program code into four program code portions, shown as Line 1 (e.g., x=[1 2, 3 4, 5 6]), Line 2 (e.g., y=[4 4]), Line 3 (e.g., plot(x)), and Function A (e.g., the four lines of code shown as func(DoMath), z=y*y, return z, and end).

As further shown in FIG. 5A, and by reference number 510, assume that client device 210 evaluates the four program code portions and provides results of the evaluation. For example, assume that client device 210 evaluates Line 1, x=[1 2, 3 4, 5 6], to generate a three by two array stored using the variable x, and provides a representation of the three by two array stored in x, as shown. Further, assume that client device 210 evaluates Line 2, y=[4 4], to generate a one by two array stored using the variable y, and provides a representation of the one by two array stored in y, as shown. Further, assume that client device 210 evaluates Line 3, plot(x), to generate a plot based on the three by two array stored in x, and provides a representation of the plot, as shown. Finally, assume that client device 210 evaluates Function A to generate a one by two array stored using the variable z, and provides a representation of the one by two array stored in z, as shown.

Figure 5B:
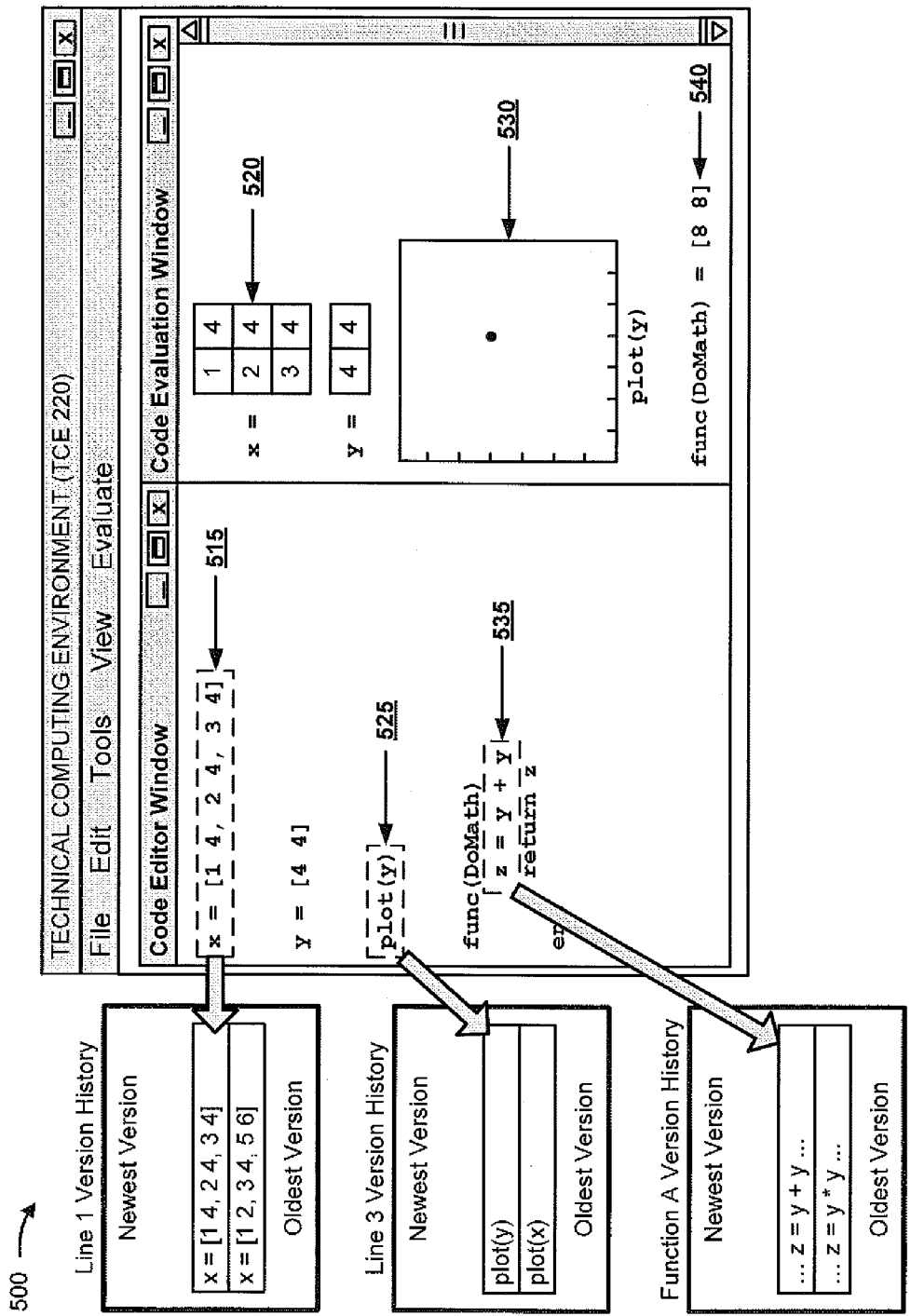

As shown in FIG. 5B, and by reference number 515, assume that the user modifies Line 1 from a first version, x=[1 2, 3 4, 5 6], to a second version, x=[1 4, 2 4, 3 4]. As shown, client device 210 stores the first version of Line 1 and the second version of Line 1 in a stack associated with Line 1, shown as "Line 1 Version History." Client device 210 also stores an indication that the second version of Line 1 is newer than the first version of Line 1 (e.g., was input, created, stored, etc. later than the first version). As shown by reference number 520, client device 210 evaluates the second version of Line 1 to generate a new result (e.g., a new array), and replaces an old result, corresponding to the first version of Line 1, with the new result, corresponding to the second version of Line 1.

As shown by reference number 525, further assume that the user modifies Line 3 from a first version, plot(x), to a second version, plot(y). As shown, client device 210 stores the first version of Line 3 and the second version of Line 3 in a stack associated with Line 3, shown as "Line 3 Version History." The stack associated with Line 3 stores a separate version history than the stack associated with Line 1. Client device 210 also stores an indication that the second version of Line 3 is newer than the first version of Line 3. As shown by reference number 530, client device 210 evaluates the second version of Line 3 to generate a new result (e.g., a new plot), and replaces an old result, corresponding to the first version of Line 3, with the new result, corresponding to the second version of Line 3.

As shown by reference number 535, further assume that the user modifies Function A from a first version, which includes the line z=y*y, to a second version, which includes the line z=y+y. As shown, client device 210 stores the first version of Function A and the second version of Function A in a stack associated with Function A, shown as "Function A Version History." The stack associated with Function A stores a separate version history than the stack associated with Line 1 and the stack associated with Line 3. Client device 210 also stores an indication that the second version of Function A is newer than the first version of Function A. As shown by reference number 540, client device 210 evaluates the second version of Function A to generate a new result (e.g., a new value of z), and replaces an old result, corresponding to the first version of Function A, with the new result, corresponding to the second version of Function A.

Figure 5C:
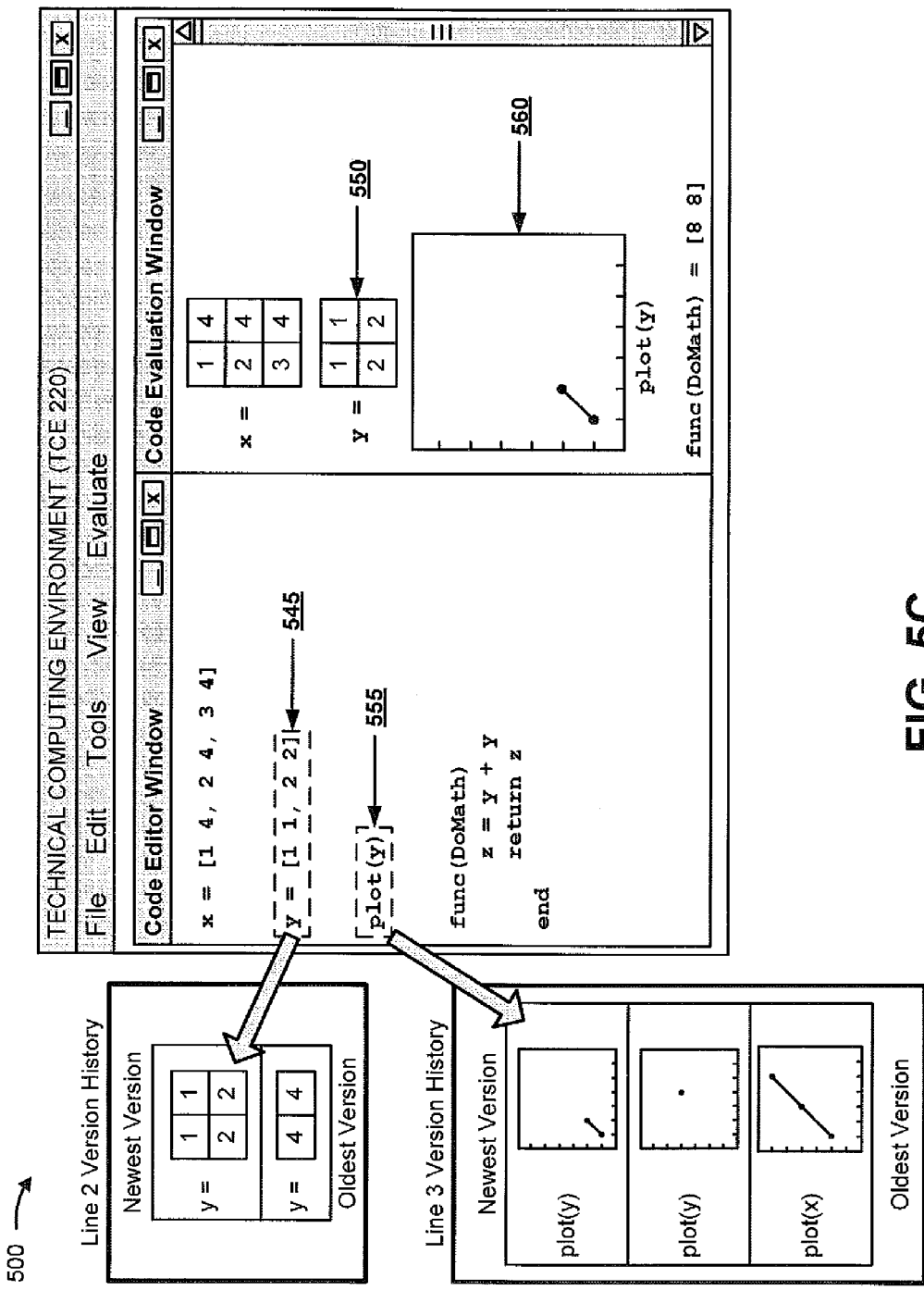

FIG. 5C shows an example where client device 210 stores results (and/or information that identifies results) in the version history stack. As shown by reference number 545, assume that the user modifies Line 2 from a first version, y=[4 4], to a second version, y=[1 1, 2 2]. As shown, client device 210 stores the first version of Line 2 and the second version of Line 2 in a stack associated with Line 2, shown as "Line 2 Version History." Furthermore, client device 210 stores a result, associated with each version, in the stack. As shown by reference number 550, client device 210 evaluates the second version of Line 2 to generate a new result (e.g., a new array stored in y), and replaces an old result, corresponding to the first version of Line 2, with the new result, corresponding to the second version of Line 2.

As shown by reference number 555, assume that the user modification to Line 2 causes client device 210 to evaluate Line 3, plot(y), and generate a new result for Line 3 based on the second version of Line 2 (e.g., a change in the value of y). As shown, client device 210 stores the new result for Line 3 (e.g., a third version of Line 3) in the stack associated with Line 3, even though the actual text of Line 3 has not changed. As shown by reference number 560, client device 210 evaluates the third version of Line 3, using the new value of y input on the second version of Line 2, to generate a new result (e.g., a new plot), and replaces an old result, corresponding to the second version of Line 3 and generated using the old value of y, with the new result, corresponding to the third version of Line 3.

Figure 5D:
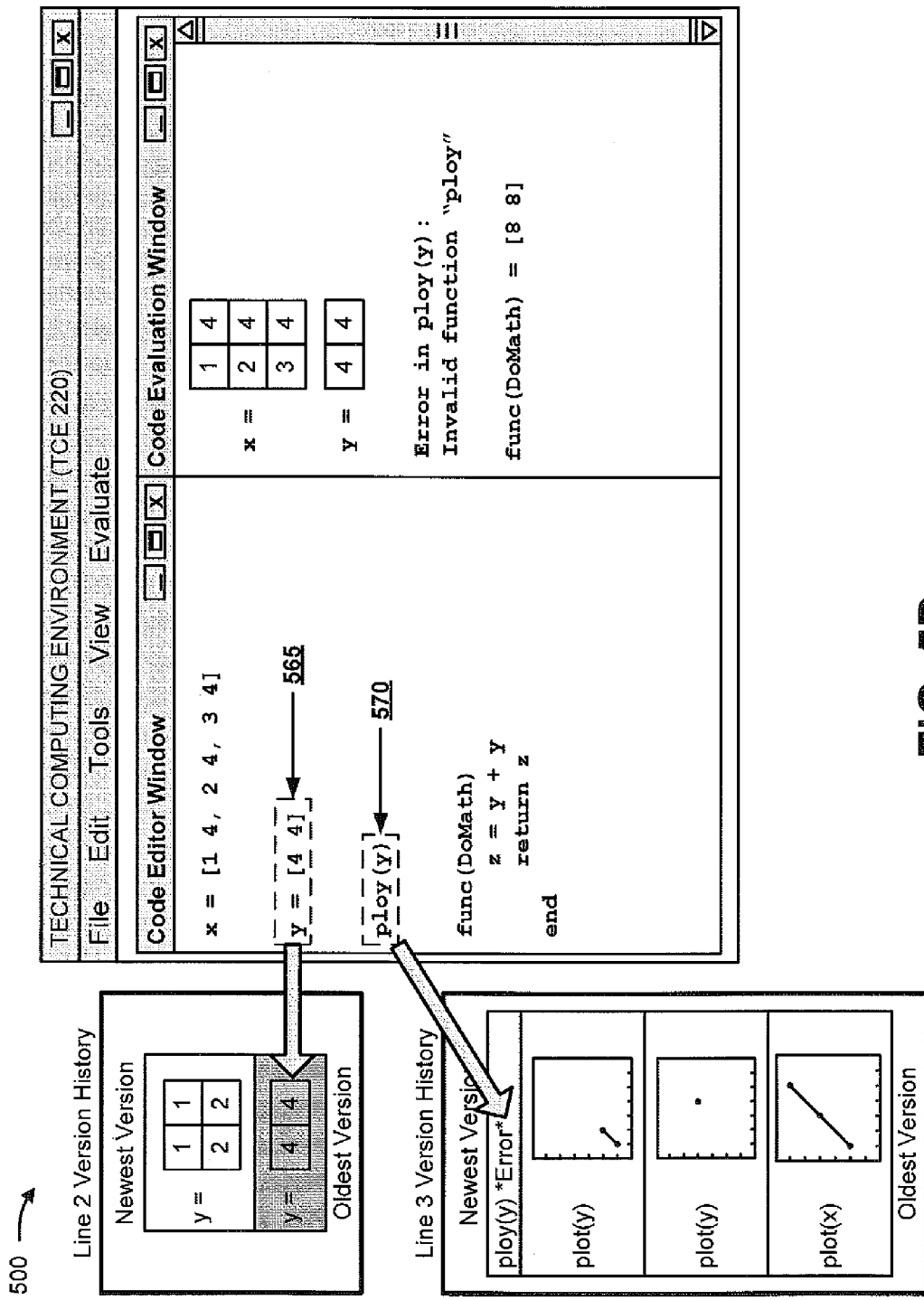

As shown in FIG. 5D, and by reference number 565, assume that the user modifies Line 2 from the second version, y=[1 1, 2 2], back to the first version, y=[4 4]. In this case, client device 210 may provide and/or store an indication that the first version has been restored, as shown by the gray highlighting in the Line 2 Version History stack. Additionally, or alternatively, client device 210 may add another copy of the first version to the stack (e.g., as a third version marked as newer than the second version), may alter the temporal relationship associated with the first version and the second version (e.g., to indicate that the first version is newer than the second version), or the like.

As shown by reference number 570, assume that the user modifies Line 3 from the third version, plot(y) (e.g., where y=[1 1, 2 2]), to a fourth version, shown as ploy(y). Assume that ploy(y) includes an error because ploy is not a valid function. As shown, client device 210 stores the fourth version of Line 3 in the stack associated with Line 3. Furthermore, client device 210 stores an error indicator in the stack, indicating that the fourth version of Line 3 results in an error. Alternatively, client device 210 may not store versions of code that result in errors, in some implementations.

As indicated above, FIGS. 5A-5D are provided merely as an example. Other examples are possible and may differ from what was described with regard to FIGS. 5A-5D.

FIG. 6 is a flow chart of an example process 600 for replacing a first version of a program code portion with a second version of the program code portion. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a selection of a portion of program code (block 610). For example, client device 210 may receive user input that identifies a portion of program code. In some implementations, multiple portions of program code may be provided via a user interface of client device 210 (e.g., via TCE 220), and a user may interact with the user interface to select a portion of program code. The user may, for example, click on a program code portion, provide input that identifies a program code portion (e.g., by typing a line number, a function name, a variable, etc.), etc.

Client device 210 may provide, via the user interface, version history indicators associated with program code portions that have a version history. A version history indicator may indicate that a particular program code portion is associated with a version history (e.g., that client device 210 and/or another device stores a data structure that includes multiple versions of the particular program code portion). In some implementations, client device 210 may only provide version history indicators for program code portions associated with two or more versions. Client device 210 may detect a user interaction with a version history indicator associated with a particular portion of program code.

As further shown in FIG. 6, process 600 may include providing a version history associated with the selected portion of program code (block 620). For example, client device 210 may provide, via a user interface, a version history associated with the selected program code portion. The version history may include information that identifies one or more versions of the selected program code portion. The version history may include one or more stored versions (e.g., stored as described herein in connection with FIG. 4), such as a current version (e.g., that is currently being provided via the user interface and/or that has been most recently input), a non-current version (e.g., that is not currently being provided via the user interface and/or that has been input before the most recent version), etc.

In some implementations, client device 210 may determine the version history to be provided by identifying a data structure that stores information that identifies versions of the selected portion of program code, such as a data structure created as described herein in connection with FIG. 4. For example, client device 210 may identify a stack associated with the selected program code portion, and may provide the stack for display. Additionally, or alternatively, client device 210 may determine the version history by determining stored versions that have a relationship with the selected portion of program code (e.g., based on a stored relationship).

Client device 210 may provide the version history by providing a version indicator that identifies a version. In some implementations, the version indicator may include a version number (e.g., that indicates a temporal order) and/or may include program code (e.g., textual code, graphical code, etc.) included in one or more versions. Additionally, or alternatively, client device 210 may provide the version history by providing a result associated with one or more versions (e.g., a result generated by evaluating the version of program code, such as an execution result, an error indicator, help information, etc.). Client device 210 may provide program code and/or a result in association with a version indicator (e.g., displayed next to a version indicator), and/or may provide the program code and/or the result based on a user interaction with the version indicator (e.g., hovering over a version indicator, clicking on a version indicator, selecting a version indicator, etc.).

In some implementations, client device 210 may provide an indication of a temporal relationship between the provided versions. For example, client device 210 may provide the versions in a vertical list with the most recent version being placed at the top of the list, and versions descending down the list in order of most recent to least recent.

Client device 210 may provide information that identifies a user associated with a version, in some implementations. For example, client device 210 may provide information that identifies a user that created a version, that made a modification to the version, etc. In some implementations, client device 210 may provide information that identifies one or more users that created and/or made edits to a particular portion of program code. Client device 210 may receive a selection of information that identifies one or more of the users, and may provide a version history that includes versions associated with the one or more selected users.

In some implementations, client device 210 may provide an indication of how one or more versions affect program code portions that depend from and/or that are related to the selected program code portion to which the versions correspond. For example, restoring a version of a first line of code (e.g., by altering a variable value) may impact a result associated with a second, dependent, line of code (e.g., that performs an operation using the variable). In this case, client device 210 may provide an indication of a new result, generated by evaluating the second line of code that depends from the restored version of the first line of code. Client device 210 may provide the new result in association with a version indicator, and/or may provide the new result based on a user interaction with the version indicator. In this way, the user can see how different versions of the code impact one or more results.

Additionally, or alternatively, client device 210 may provide a related history that includes one or more versions of program code portions other than the selected program code portion. The related history may include, for example, a version of a code portion that depends from the selected code portion, a version of a code portion from which the selected code portion depends, a version of a code portion that includes program code related to the program code of the selected program code portion (e.g., that includes the same function, a similar function, the same variable, a similar variable, etc.), a version of a code portion that shares some code in common with the selected code portion, etc.

Client device 210 may provide the version history and/or the related history in a particular order, in some implementations. For example, client device 210 may provide the version history and/or the related history in temporal order (e.g., from most recent to least recent, from least recent to most recent, etc.). As another example, client device 210 may provide the version history and/or the related history based on a quantity of occurrences throughout the program code (e.g., from most occurrences to least occurrences, from least occurrences to most occurrences, etc.). As another example, client device 210 may provide the related history based on a relevance score of related versions to the selected code portion (e.g., from most related to least related, from least related to most related, etc.). For example, client device 210 may treat a related version that uses the same function as the select code portion with a higher relevance score than a related version that does not use the same function (e.g., that uses a similar function).

In some implementations, client device 210 may calculate a version score for a version based on one or more of the above factors. For example, client device 210 may calculate a version score for a version based on the temporal order (e.g., based on how recently the version was input, evaluated, stored, etc.), based on a quantity of occurrences of the version, based on a relevance score of the version, based on a time associated with the version (e.g., a date and/or time at which the version was input, evaluated, stored, etc.), based on the quantity of times that the version has been executed, based on information relating to a user associated with the version (e.g., a user that created the version), etc. Client device 210 may provide multiple versions included in the version history and/or the related history in an order based on the version score (e.g., from highest score to lowest score, from lowest score to highest score, etc.).

Client device 210 may provide multiple versions (and/or information associated with multiple versions), included in the version history, for display. In this way, a user may compare different versions, and may select a version to be restored based on the comparison. For example, client device 210 may display first program code, associated with a first version (e.g., a current version) along with second program code, associated with a second version (e.g., a stored version). Client device 210 may display the first program code and the second program code in a different manner (e.g., using different colors, different fonts, different sizes, using an indicator that identifies a current version and a stored version, etc.). Additionally, or alternatively, client device 210 may display a first result, associated with a first version, along with a second result, associated with a second version. Client device 210 may display the first result and the second result in a different manner. Client device 210 may receive a user selection of a version provided in this manner.

Additionally, or alternatively, client device 210 may provide the multiple versions and/or information associated with the multiple versions sequentially (e.g., as a slide show). For example, client device 210 may display a most recent version for a particular period of time, may display a next most recent version for a particular period of time, etc., and may cycle through the different versions. Client device 210 may receive user input that identifies the particular period of time (e.g., the speed of transitions in the slide show). Client device 210 may receive a user selection of a version provided in this manner.

As further shown in FIG. 6, process 600 may include receiving an indication to replace a current version, of the selected portion of program code, with a different version (block 630), and replacing the current version with the different version (block 640). For example, client device 210 may receive (e.g., based on user input) an indication to replace a current version, of the portion of program code, with a different version. The current version may include, for example, a currently displayed version, a currently provided version, a version that has been most recently input, a version that has been most recently executed, etc. The different version may include a version stored as part of a version history associated with the selected portion of program code. Client device 210 may replace the current version with the different version by providing the different version via a user interface and removing the current version from the user interface (e.g., at a position within the code that corresponds to the selected program code portion).

In some implementations, client device 210 may receive the indication to replace the current version based on receiving a user selection of the different version via a version history provided via a user interface. For example, the user may select a particular line of code, for which a current version is displayed on the user interface. Client device 210 may provide a version history associated with the selected line of code, and the user may select a different version (e.g., a stored version) to replace the current version. Based on the user selection of the different version, client device 210 may replace the current version with the different version.

Additionally, or alternatively, client device 210 may receive input (e.g., from a user) that causes client device 210 to perform an undo operation or a redo operation associated with a selected program code portion. For example, a user may select a portion of program code, and may click on an undo button. In this case, client device 210 may not provide the version history. Rather, client device 210 may determine the different version to replace the current version based on a temporal relationship between the versions included in the version history. For example, when performing an undo operation, client device 210 may determine the different version to be a version that was input, evaluated, stored, etc. immediately before the current version (e.g., with no intervening versions). As another example, when performing a redo operation, client device 210 may determine the different version to be a version that was input, evaluated, stored, etc. immediately after the current version (e.g., with no intervening versions). Additionally, or alternatively, a user may designate a version as a default version, and client device 210 may restore the default version when the user selects an undo operation.

As further shown in FIG. 6, process 600 may include providing a result associated with the different version (block 650). For example, client device 210 may determine a result associated with the different version, and may provide the result (e.g., via the user interface). Client device 210 may determine the result by, for example, evaluating the different version, restoring the result (e.g., from memory), or the like. In some implementations, client device 210 may alter the version history (e.g., to indicate that the different version is now the most current version). In this way, a user may be allowed to easily switch between different versions of individual portions of program code, and to see how those versions impact the results of evaluating the program code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7L are diagrams of an example implementation 700 relating to example process 600 shown in FIG. 6. FIGS. 7A-7L depict examples where client device 210 restores different versions of program code portions.

For the purpose of FIG. 7A, assume that the user has input the information described in connection with FIGS. 5A-5D, and that client device 210 has performed the operations described in connection with FIGS. 5A-5D. As shown by reference number 702, assume that the user interacts with TCE 220 to provide input indicating that client device 210 is to show version history indicators.

Figure 7B:
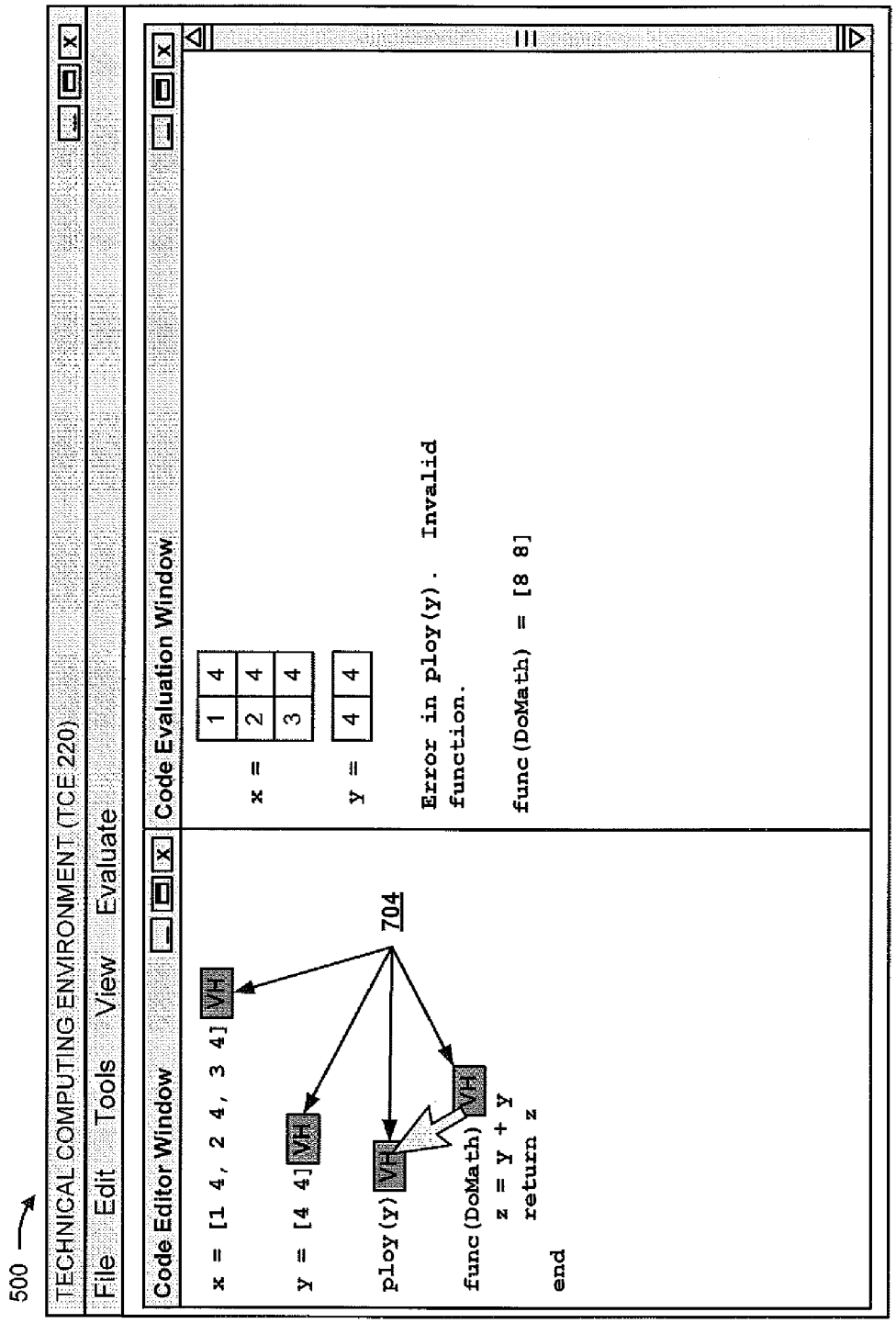
FIGS. 7A-7L are diagrams of an example implementation relating to the example process shown in FIG. 6.

As shown in FIG. 7B, and by reference number 704, based on the user input, client device 210 provides version history indicators associated with Line 1, Line 2, Line 3, and Function A. Assume that client device 210 provides these indicators because each of these program code portions are associated with multiple versions of program code. If a particular program code portion is not associated with multiple versions, then client device 210 may not provide a version history indicator for the particular program code portion, in some implementations. As further shown, assume that the user interacts with a version history indicator associated with Line 3, ploy(y).

Figure 7C:
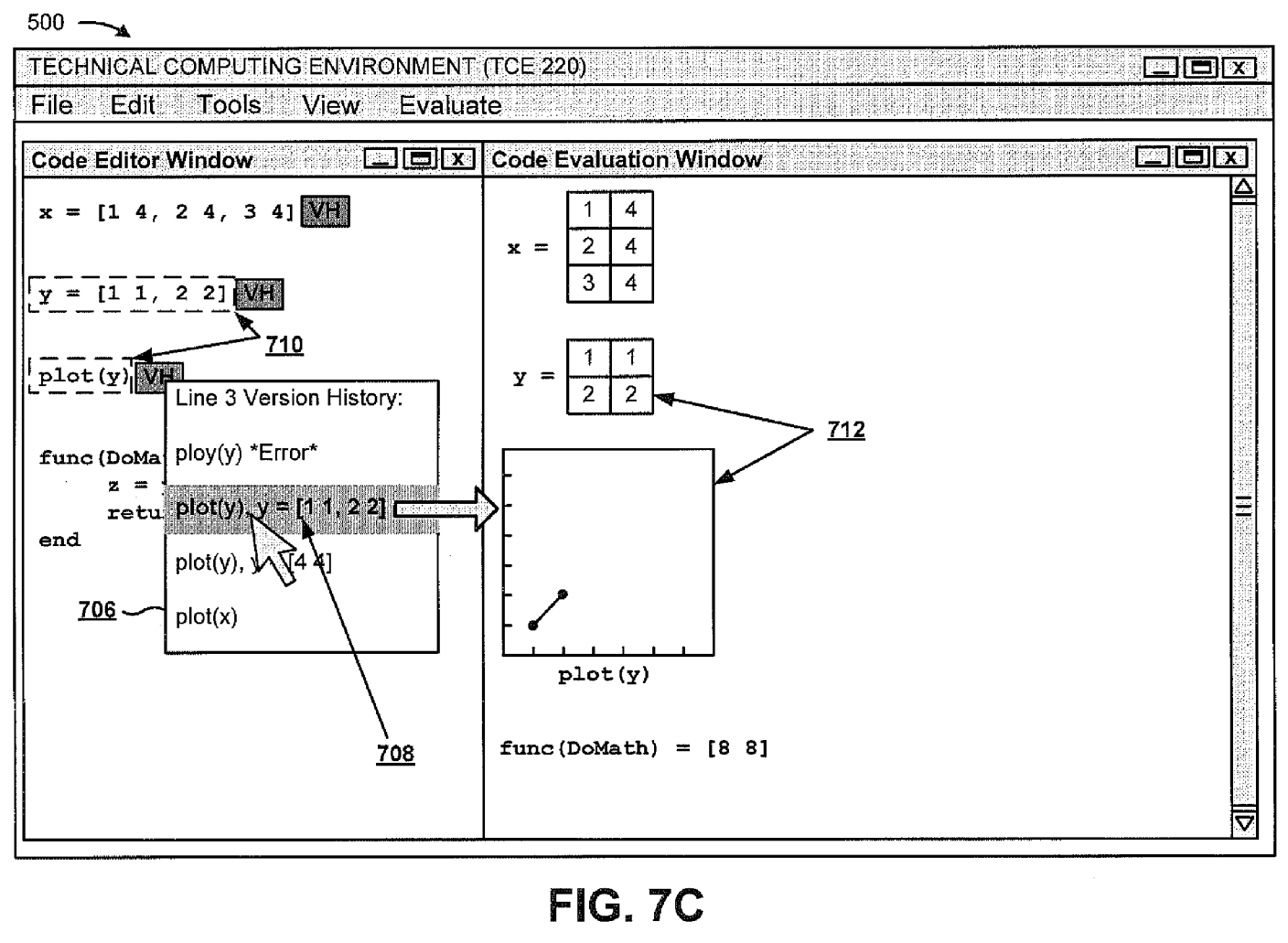

As shown in FIG. 7C, and by reference number 706, assume that client device 210 provides a version history based on the user interaction. The version history identifies a most recent version, shown as ploy(y), a second-most recent version, shown as plot(y) where y=[1 1, 2 2], a third-most recent version, shown as plot(y) where y=[4 4], and an oldest version, shown as plot(x). As shown by reference number 708, assume that the user selects the second-most recent version, shown as plot(y) where y=[1 1, 2 2]. Based on the user interaction, client device 210 replaces y=[4 4], on Line 2, with y=[1 1, 2 2], and replaces ploy(y), on Line 3, with plot(y), as shown by reference number 710. These lines correspond to the selected version of Line 3. As shown by reference number 712, client device 210 provides results associated with the selected version. Thus, as shown, selection of a version associated with a particular line of code may cause client device 210 to modify multiple lines of code (e.g., the particular line of code and one or more other lines of code).

Figure 7D:
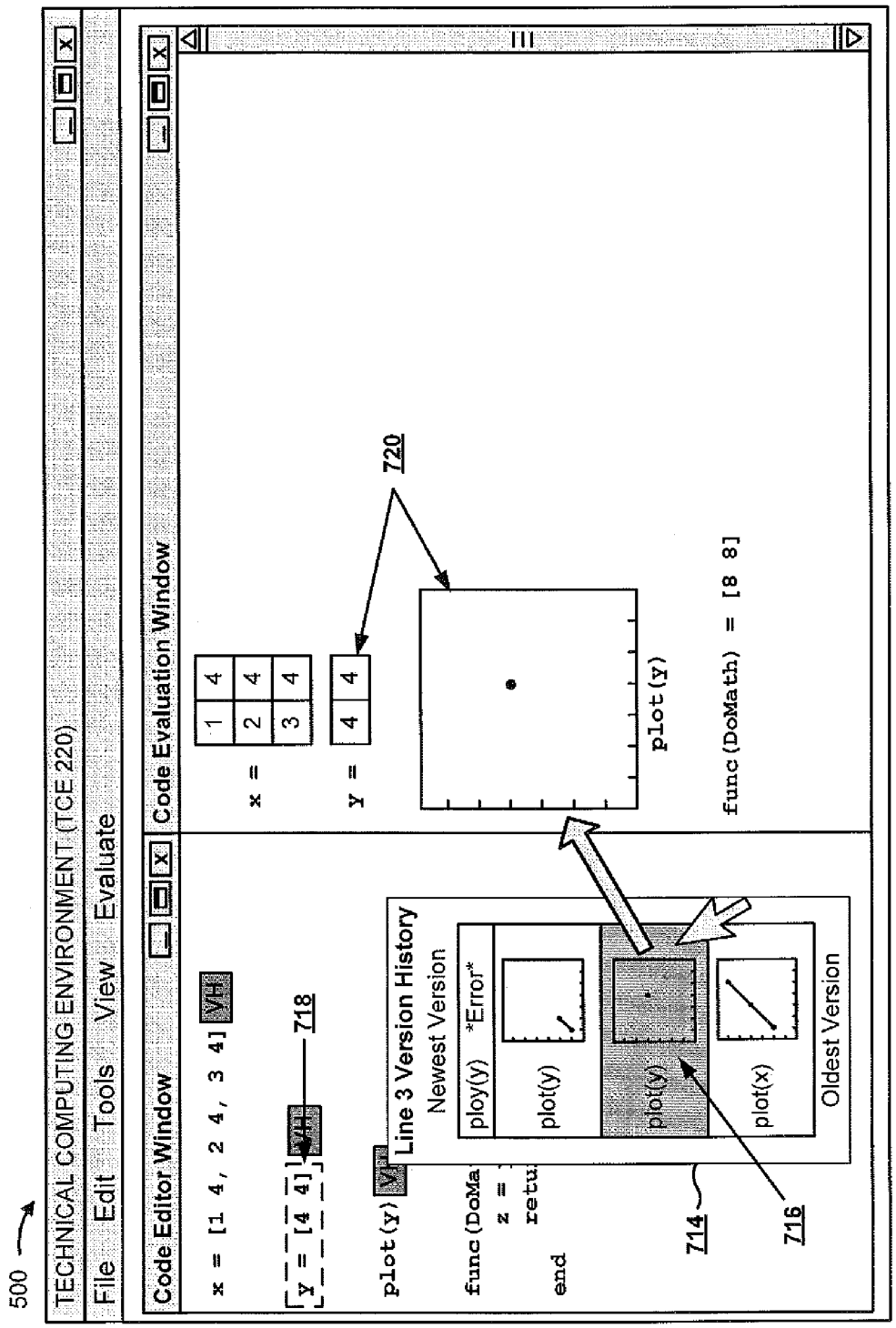

As shown in FIG. 7D, and by reference number 714, the provided version history may identify a result associated with each version. In some implementations, a user may provide input to select whether client device 210 displays program code versions, result versions, or both. For example, client device 210 may provide a thumbnail of a plot associated with each version of Line 3. As shown by reference number 716, assume that the user selects the third-most recent version, shown as plot(y) where y=[4 4]. Based on the user interaction, client device 210 replaces y=[1 1, 2 2], on Line 2, with y=[4 4], as shown by reference number 718. As further shown, client device 210 may provide an indication of one or more code portions that have been replaced (e.g., shown as a dashed line rectangle around Line 2). As shown by reference number 720, client device 210 provides results associated with the selected version. Thus, as shown, selection of a version associated with a particular line of code may cause client device 210 to modify a line of code other than the particular line of code (e.g., without modifying the particular line of code).

Figure 7E:
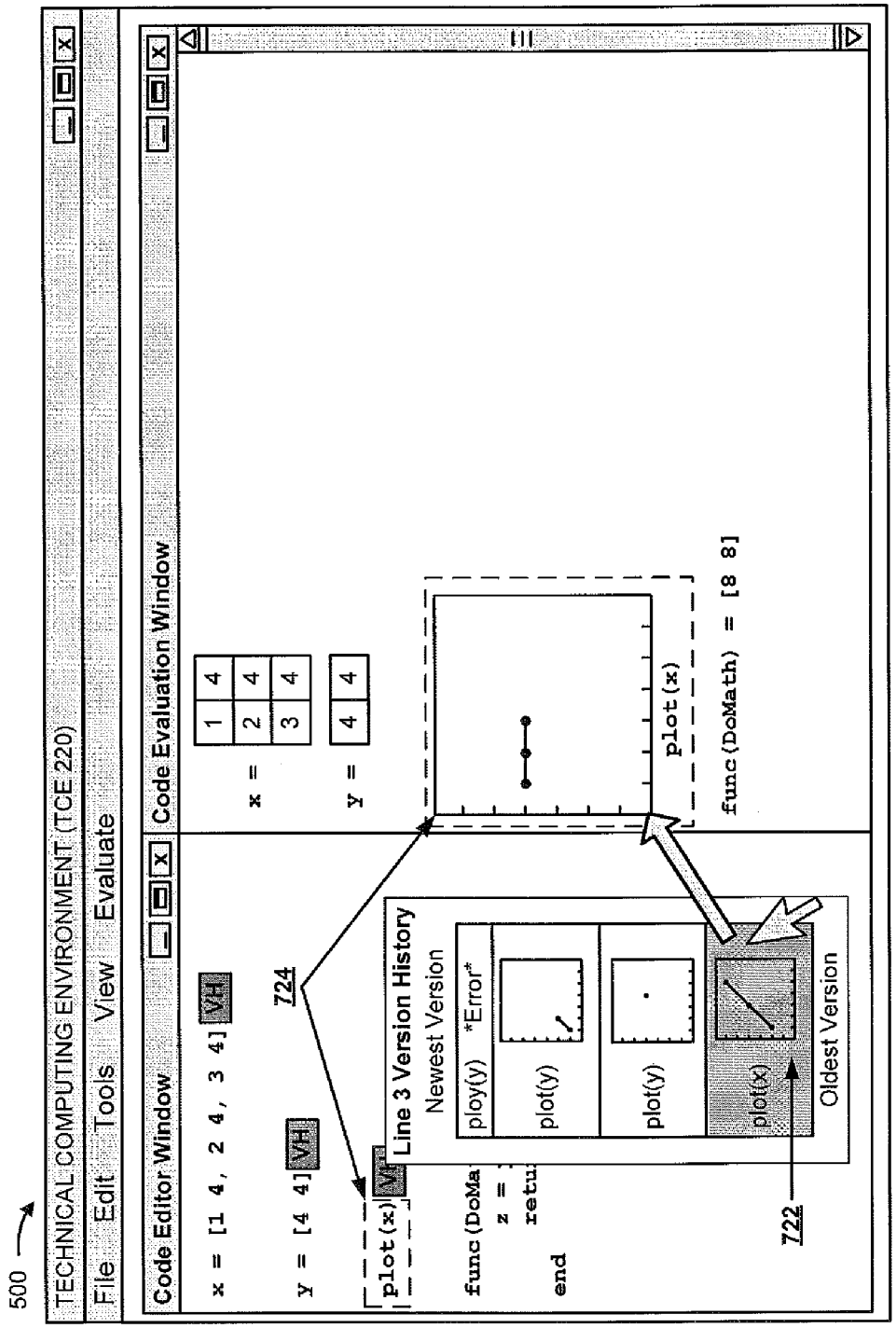
Figure 7F:
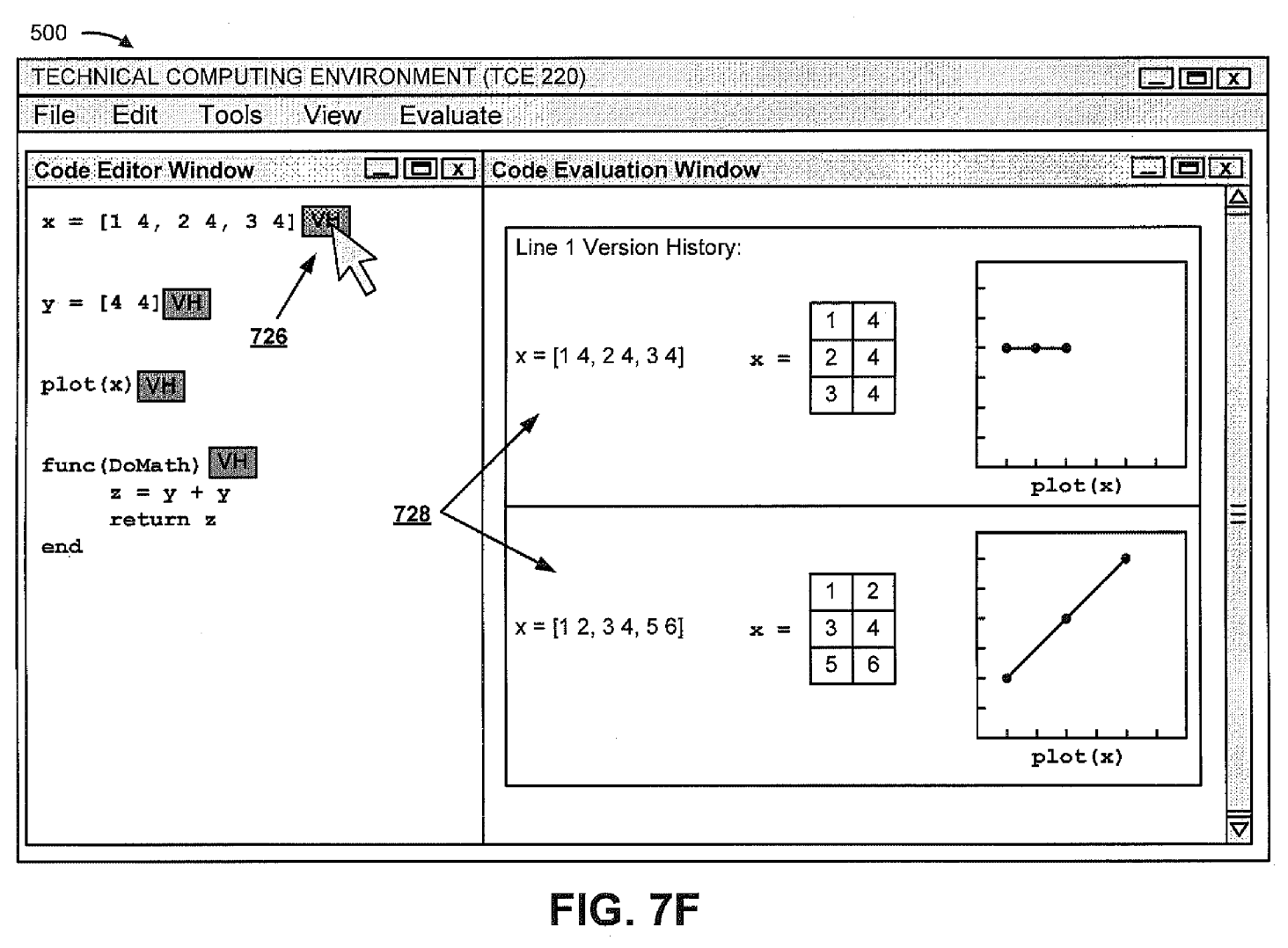
Figure 7G:
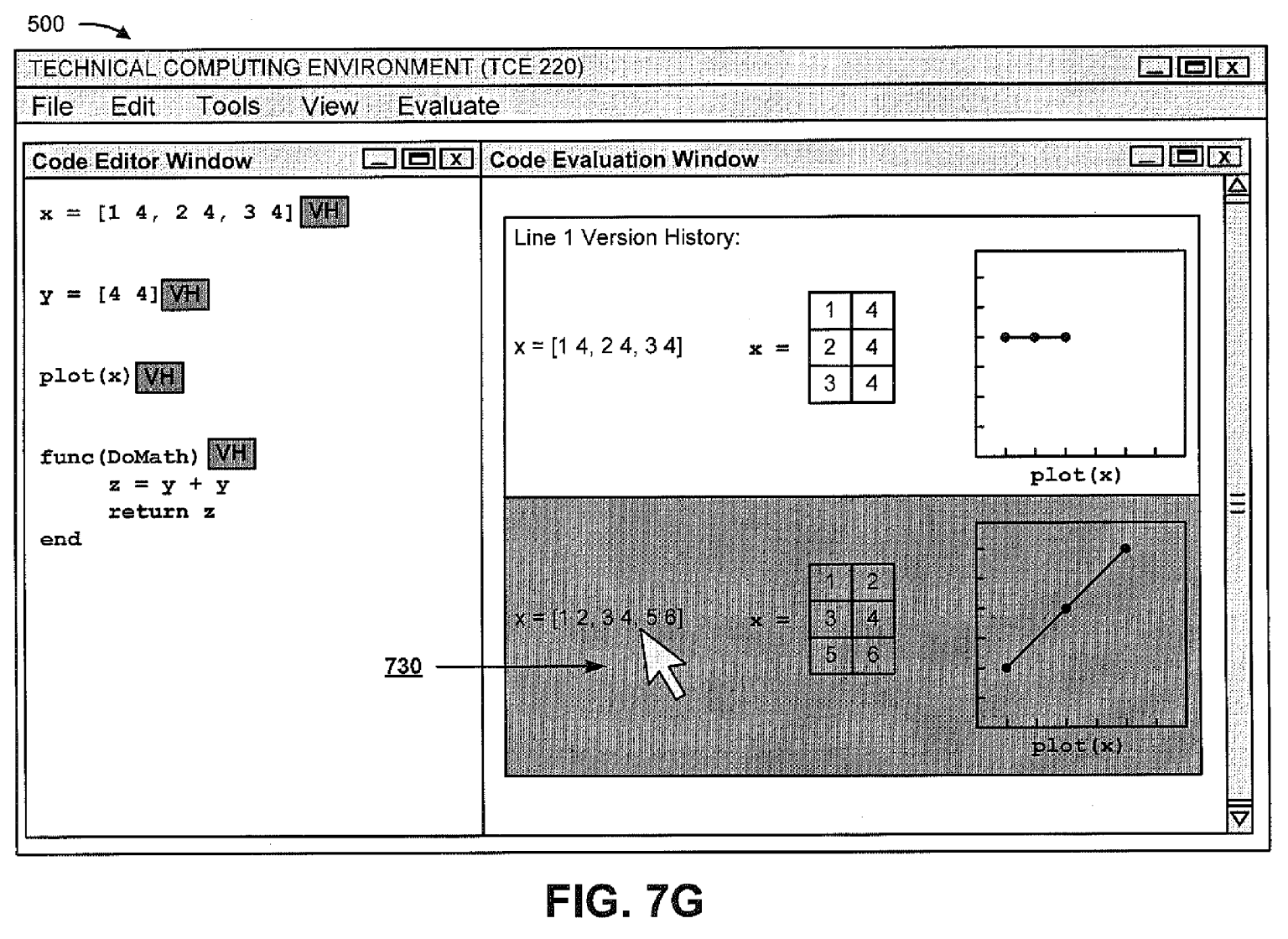
Figure 7H:
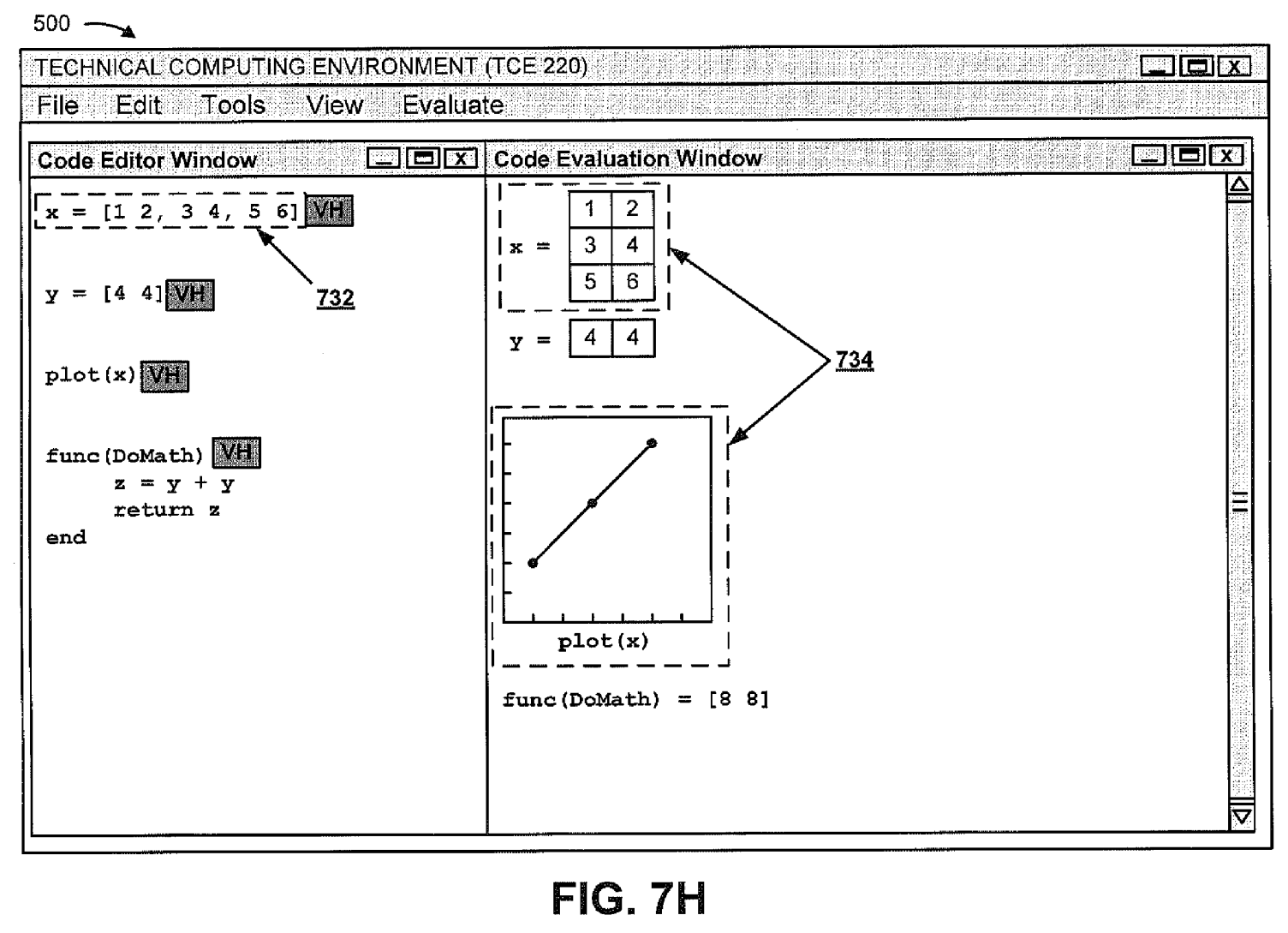
Figure 7:
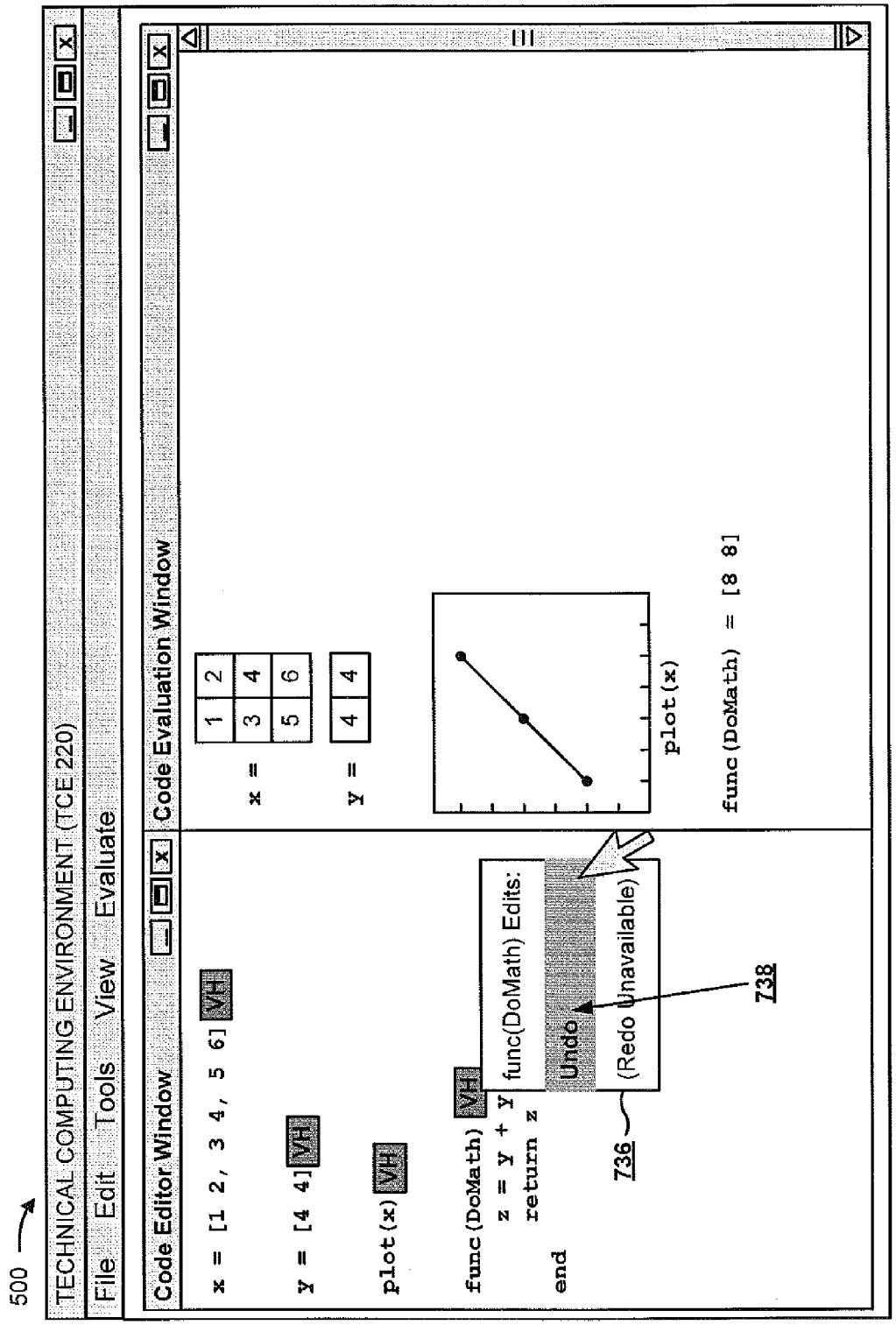

As shown in FIG. 7E, and by reference number 722, assume that the user selects the oldest version, shown as plot(x). Based on the user interaction, client device 210 replaces plot(y), on Line 3, with plot(x), and replaces a result associated with Line 3, as shown by reference number 724. As further shown, client device 210 may provide an indication of one or more results that have been replaced (e.g., shown as a dashed line rectangle around the displayed plot). Thus, as shown, selection of a version associated with a particular line of code may cause client device 210 to modify the particular line of code.

As shown in FIG. 7F, and by reference number 726, assume that the user interacts with a version history indicator associated with Line 1, shown as x=[1 4, 2 4, 3 4]. Based on the user interaction, client device 210 provides a version history associated with Line 1, as shown by reference number 728. As shown, the version history may provide program code associated with each version of Line 1 (e.g., a most-recent version of x=[1 4, 2 4, 3 4] and an oldest version of x=[1 2, 3 4, 5 6]), a result generated by evaluating each version of Line 1 (e.g., shown as arrays of values), and a result associated with a line of code that depends from Line 1 (e.g., shown as plots generated based on evaluating Line 3, plot(x), which depends from Line 1).

Figure 7J:
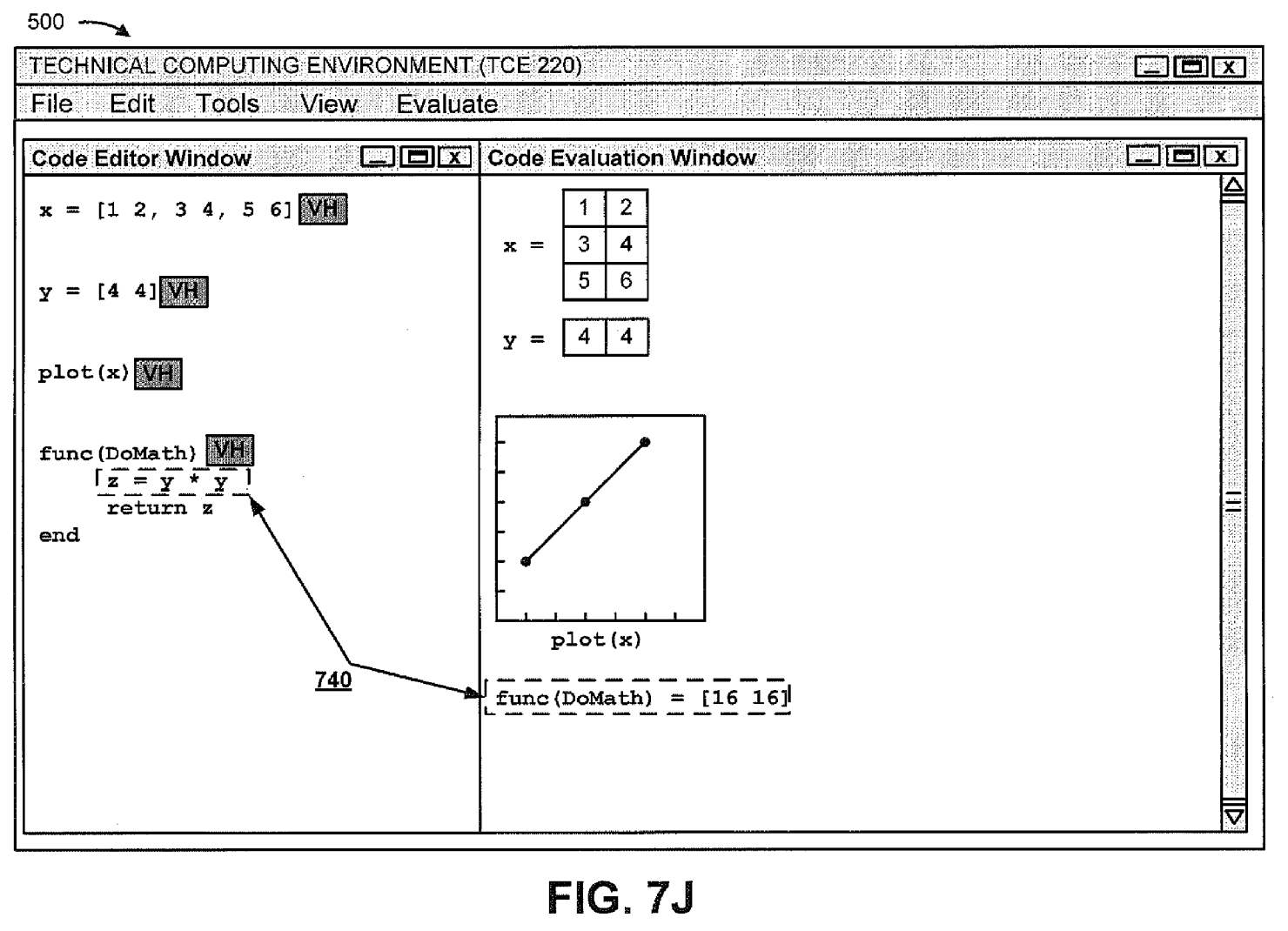

As shown in FIG. 7G, and by reference number 730, assume that the user selects the oldest version of Line 1, shown as x=[1 2, 3 4, 5 6]. As shown in FIG. 7H, and by reference number 732, based on the user selection, client device 210 replaces the displayed version of Line 1, x=[1 4, 2 4, 3 4], with the selected version, shown as x=[1 2, 3 4, 5 6]. Furthermore, as shown by reference number 734, client device 210 replaces the displayed results associated with Line 1 and Line 3, which depends from Line 1, with new results based on the selected version of Line 1.

As shown in FIG. 7I, assume that the user interacts with a version history indicator associated with Function A, shown as func(DoMath). As shown by reference number 736, based on the user interaction, client device 210 provides an interface that permits the user to undo or redo edits to Function A (e.g., to switch between versions of Function A based on a temporal relationship associated with the versions). As shown by reference number 738, assume that the user selects to undo a most-recent edit to Function A. As shown by reference number 7J, and by reference number 740, client device 210 undoes a most-recent edit to Function A to replace the line z=y+y with z=y*y, and provides a result generated by evaluating z=y*y, shown as func(DoMath)=[1616].

Figure 7K:
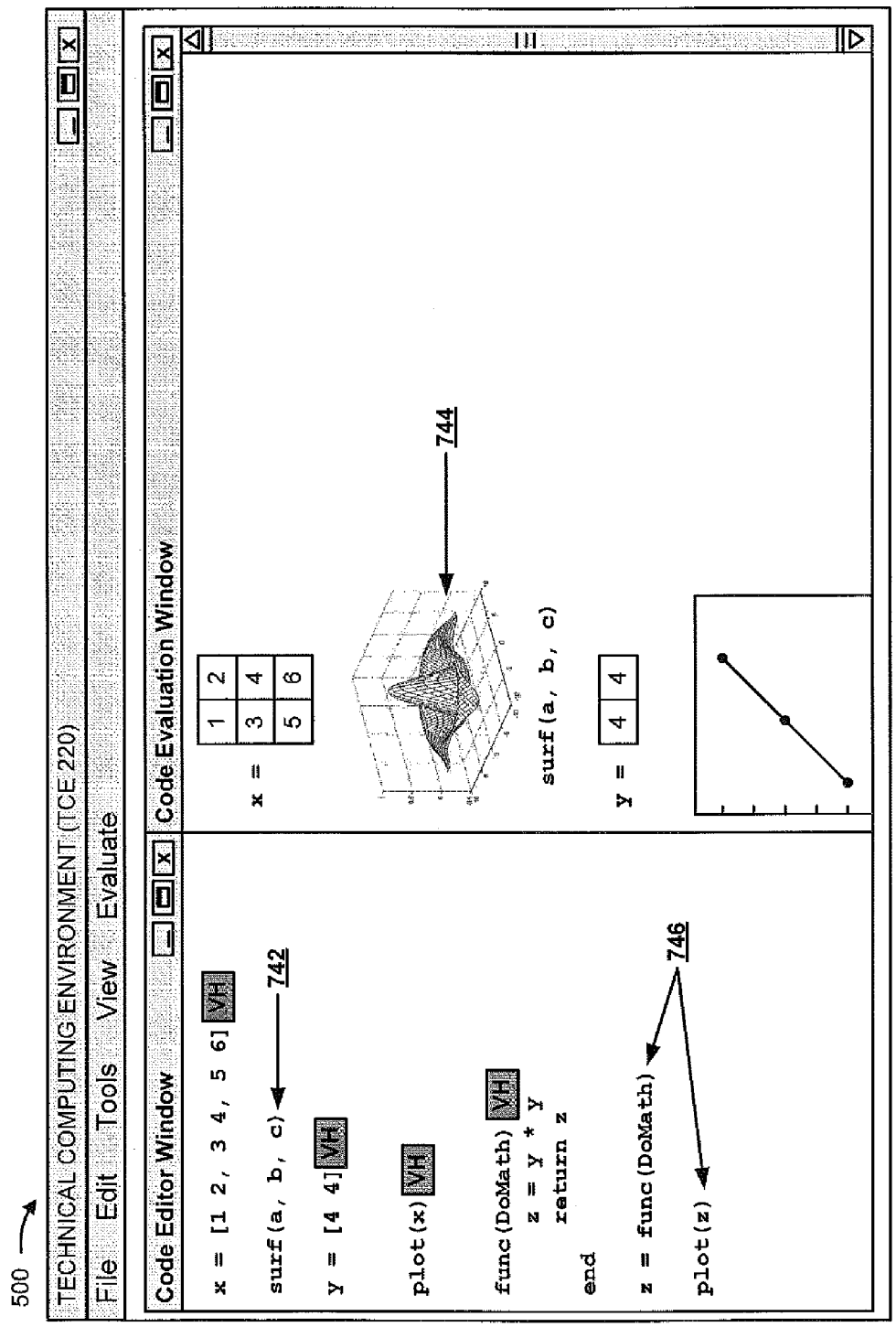

As shown in FIG. 7K, and by reference number 742, assume that the user inserts a new line of program code, shown as surf(a, b, c). Based on the insertion of the new line of program code, client device 210 generates and provides a surface plot, as shown by reference number 744. As shown by reference number 746, assume that the user also adds two new lines of program code at the end of the program, shown as z=func(DoMath) and plot(z).

Figure 7L:
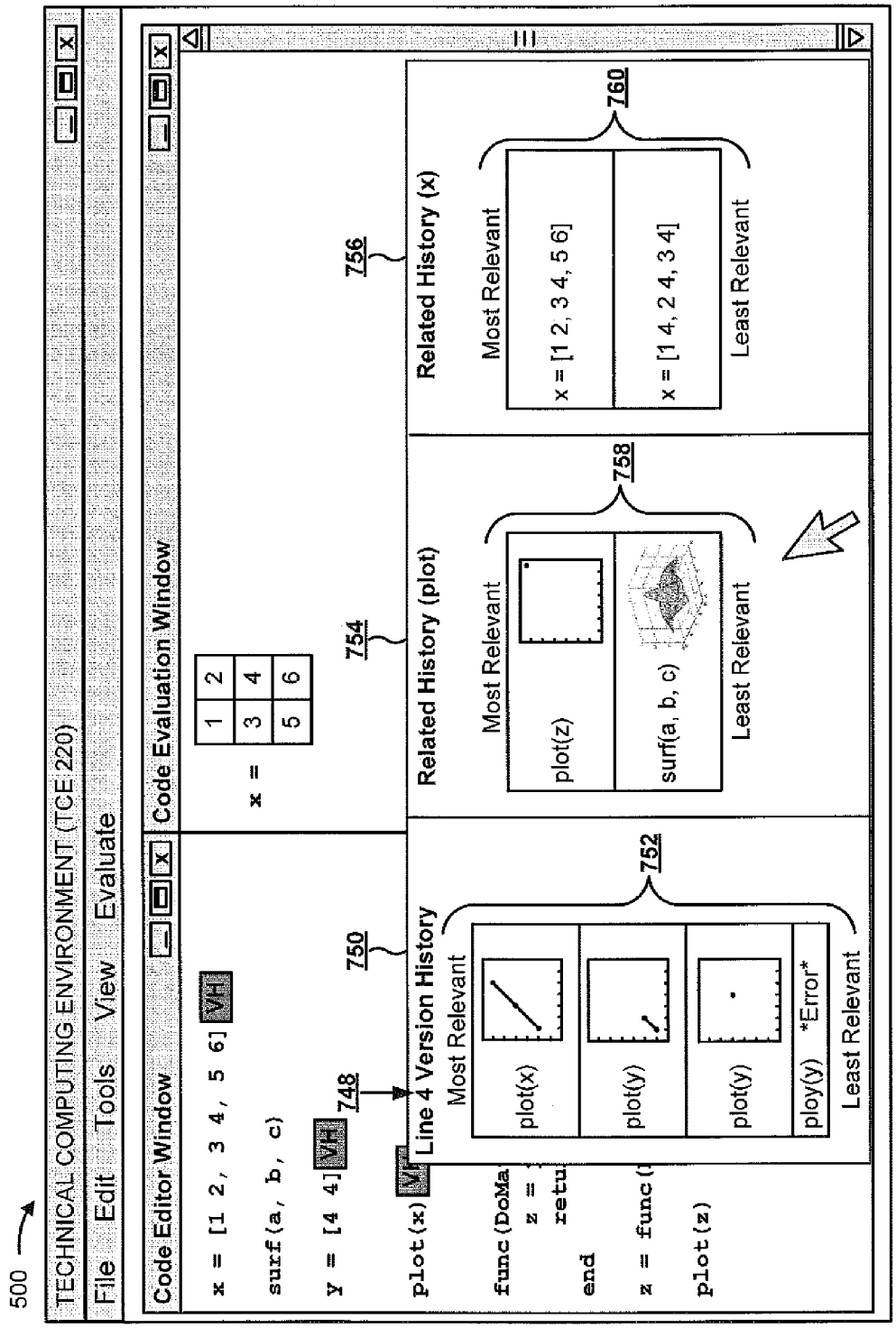

As shown in FIG. 7L, assume that the user interacts with a version history indicator associated with Line 4, shown as plot(x). Because the user has inserted a line of code above plot(x), the line number of plot(x) has been updated to preserve the version history associated with plot(x). As shown by reference number 748, plot(x) has been renumbered from Line 3 to Line 4.

As shown by reference number 750, based on the user interaction with the version history indicator, client device 210 provides a version history associated with Line 4. As shown by reference number 752, client device 210 may order the version history from a most relevant version to a least relevant version (e.g., rather than strictly a most-recent to least-recent version). Client device 210 may order the versions based on a relevancy score, which may be based on a recency (e.g., plot(x) is a current version and shows up at the top of the list), a similarity of program code and/or a result to a current version (e.g., plot(y) where y=[1 1, 2 2] is shaped more similarly to plot(x) than plot(y) where y=[4 4]), whether or not a version is associated with an error (e.g., ploy(y) is shown at the bottom of the list because it evaluates to an error), etc.

As shown by reference numbers 754 and 756, based on the user interaction with the version history indicator, client device 210 further provides a related history. Related history 754 shows versions of program code related to the plot function, which is included in Line 4. The versions shown via related history 754 includes versions that are not a result of modifying Line 4 (e.g., versions that are not included in version history 750). For example, as shown by reference number 758, client device 210 provides program code and a result for plot(z) and surf(a, b, c). Client device 210 may indicate that plot(z) is more relevant to Line 4 than surf(a, b, c) because Line 4 includes the plot function, which is the same function as plot(z), and is similar to, but not the same as, the surf function.

Related history 756 shows versions of program code related to the variable x, which is included in Line 4. The versions shown via related history 756 includes versions that are not a result of modifying Line 4 (e.g., versions that are not included in version history 750). For example, as shown by reference number 760, client device 210 provides program code for x=[1 2, 3 4, 5 6] and x=[1 4, 2 4, 3 4] (e.g., associated with Line 1). Client device 210 may indicate that x=[1 2, 3 4, 5 6] is more relevant to Line 4 than x=[1 4, 2 4, 3 4] because the currently selected version of Line 4 generates a plot based on x=[1 2, 3 4, 5 6].

As indicated above, FIGS. 7A-7L are provided merely as an example. Other examples are possible and may differ from what was described with regard to FIGS. 7A-7L.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   obtain program code;
   partition the program code into a plurality of portions of program code,
      the plurality of portions including a first portion of program code and a second portion of program code;
   store, in a first data structure, information that identifies the first portion of program code;
   store, in a second data structure, information that identifies the second portion of program code,
      the first data structure and the second data structure being separately identifiable;
   receive, via a user interface, input that modifies the first portion of program code from a first version to a second version;
   store, in the first data structure, information that identifies the first version and the second version;
   receive an indication to replace the second version with the first version;
   identify the first data structure based on receiving the indication;
   identify the first version using the first data structure; and
   replace the second version with the first version, by providing the first version via the user interface, based on identifying the first version.

2. The device of claim 1, where the one or more processors are further to:
   receive a selection of the first portion of program code;
   provide a version history, associated with the first portion of program code, for display on the user interface based on receiving the selection of the first portion of program code,
      the version history identifying the first version and the second version;
   receive a selection of the first version via the user interface; and
   where the one or more processors, when receiving the indication to replace the second version with the first version, are further to:
   receive the indication to replace the second version with the first version based on receiving the selection of the first version via the user interface.

3. The device of claim 2, where the one or more processors, when storing the information that identifies the first version and the second version, are further to:
   store a first result of evaluating the first version of the first portion of program code; and
   store a second result of evaluating the second version of the first portion of program code; and
   where the one or more processors, when providing the version history, are further to:
   provide, via the user interface, the first result for display; and
   provide, via the user interface, the second result for display.

4. The device of claim 2, where the one or more processors, when providing the version history, are further to:

provide an indication of a temporal relationship between the first version and the second version.

5. The device of claim 1, where the one or more processors are further to:
provide a related history that identifies one or more related versions, of another portion of program code, that relate to the first version or the second version;
receive an indication to replace the second version with a third version, of the one or more related versions, based on providing the related history; and
replace, on the user interface, the second version with the third version based on receiving the indication to replace the second version with the third version.

6. The device of claim 1, where the one or more processors, when receiving the indication to replace the second version with the first version, are further to:
receive an indication to perform an undo operation; and
receive the indication to replace the second version with the first version based on receiving the indication to perform the undo operation.

7. The device of claim 6, where the one or more processors are further to:
receive an indication to perform a redo operation; and
replace, on the user interface, the first version with the second version based on receiving the indication to perform the redo operation.

8. A computer-readable medium storing instructions, the instructions comprising:
one or more instructions that, when executed by one or more processors, cause the one or more processors to:
partition program code into a plurality of portions of program code;
detect a first modification to a first portion of program code, of the plurality of portions of program code, from a first version to a second version;
detect a second modification to a second portion of program code, of the plurality of portions of program code, from a third version to a fourth version,
the second modification being detected after the first modification;
store a first version history, associated with the first portion of program code, that identifies the first version, the second version, and a first temporal relationship between the first version and the second version;
store a second version history, associated with the second portion of program code, that identifies the third version, the fourth version, and a second temporal relationship between the third version and the fourth version;
receive an indication to undo the first modification after detecting the second modification;
undo the first modification, without undoing the second modification, based on receiving the indication; and
provide information associated with undoing the first modification.

9. The computer-readable medium of claim 8, where the one or more instructions, that cause the one or more processors to store the first version history and the second version history, further cause the one or more processors to:
store the first version history in a first data structure; and
store the second version history in a second, different, data structure; and
where the one or more instructions, that cause the one or more processors to undo the first modification, further cause the one or more processors to:
identify the first data structure based on receiving the indication to undo the first modification; and identify the first version using the first data structure; and
replace, on a user interface, the second version with the first version based on identifying the first version.

10. The computer-readable medium of claim 9, where the one or more instructions, that cause the one or more processors to store the first version history in the first data structure, further cause the one or more processors to:
identify the first data structure based on the first portion of program code,
the first data structure identifying a plurality of versions of the first portion of program code,
the plurality of versions including the first version and the second version, the plurality of versions not including the third version or the fourth version.

11. The computer-readable medium of claim 8, where the one or more instructions, that cause the one or more processors to store the first version history and the second version history, further cause the one or more processors to:
store the first version history and the second version history in a same data structure.

12. The computer-readable medium of claim 8, where the one or more instructions, when executed by the one or more processors, further cause the one or more processors to:
receive a selection of the first portion of program code;
provide the first version history for display on a user interface based on receiving the selection of the first portion of program code;
receive a selection of the first version via the user interface; and
where the one or more instructions, that cause the one or more processors to undo the first modification, further cause the one or more processors to:
undo the first modification based on receiving the selection of the first version.

13. The computer-readable medium of claim 12, where the one or more instructions, that cause the one or more processors to provide the first version history for display, further cause the one or more processors to:
provide information that identifies the first temporal relationship.

14. The computer-readable medium of claim 8, where the one or more instructions, when executed by the one or more processors, further cause the one or more processors to:
store, based on detecting the first modification, a first result of evaluating the first version of the first portion of program code;
store, based on detecting the first modification, a second result of evaluating the second version of the first portion of program code;
provide the first result and the second result for display on a user interface;
receive a selection of the first result; and
where the one or more instructions, that cause the one or more processors to undo the first modification, further cause the one or more processors to:
undo the first modification based on receiving the selection of the first result.

15. A method, comprising:
partitioning program code into a plurality of portions of program code,
the partitioning being performed by one or more devices;
detecting a first modification to a first portion of program code, of the plurality of portions of program code, from a first version to a second version,
the detecting the first modification being performed by the one or more devices;

detecting a second modification to a second portion of program code, of the plurality of portions of program code, from a third version to a fourth version,
the detecting the second modification being performed by the one or more devices;
storing a first version history, associated with the first portion of program code, that identifies the first version and the second version,
the storing the first version history being performed by the one or more devices;
storing a second version history, associated with the second portion of program code, that identifies the third version and the fourth version,
the second version history being different from the first version history,
the storing the second version history being performed by the one or more devices;
determining to restore the first version of the first portion of program code or the third version of the second portion of program code,
the determining to restore being performed by the one or more devices; and
selectively performing a first action or a second action based on determining to restore the first version or the third version,
the first action including replacing, on a user interface, the second version with the first version when determining to restore the first version,
the second action including replacing, on the user interface, the fourth version with the third version when determining to restore the third version, and
the selectively performing being performed by the one or more devices.

16. The method of claim 15, where storing the first version history and the second version history further comprising:
storing the first version history and the second version history in separately-identifiable data structures.

17. The method of claim 15, where the second modification is detected after the first modification; and
where determining to restore the first version or the third version further comprises:
receiving an indication to perform an undo operation associated with the first portion of program code; and
determining to restore the first version based on receiving the indication to perform the undo operation.

18. The method of claim 15, further comprising:
detecting a third modification of the first portion of program code to a fifth version;
storing, in the first version history, information that identifies the fifth version;
receiving a selection of the first portion of program code;
providing, via the user interface and based on receiving the selection, information that identifies the first version, the second version, the fifth version, and a temporal relationship between the first version, the second version, and the fifth version;
detecting a selection of the first version, the second version, or the fifth version;
providing the selected version for display via the user interface; and
providing, for display, a result of evaluating the selected version of the first portion of program code.

19. The method of claim 18, where providing the information that identifies the temporal relationship further comprises:
providing the first version, the second version, and the fifth version for display in an order that indicates the temporal relationship.

20. The method of claim 15, where determining to restore the first version or the third version further comprises:
receiving an indication to provide the first version history associated with the first portion of program code;
providing information that identifies the first version and a first result of executing the first version;
providing information that identifies the second version and a second result of executing the second version;
receiving a selection of the information that identifies the first version or the first result; and
determining to restore the first version based on receiving the selection of the information that identifies the first version or the first result.

\* \* \* \* \*